(12) United States Patent
Kawaguchi et al.

(10) Patent No.: US 9,347,389 B2
(45) Date of Patent: May 24, 2016

(54) ENGINE CONTROL DEVICE OF WORK MACHINE AND ENGINE CONTROL METHOD THEREFOR

(75) Inventors: Tadashi Kawaguchi, Hiratsuka (JP); Kentaro Murakami, Chigasaki (JP); Jun Morinaga, Yokohama (JP)

(73) Assignee: Komatsu Ltd., Tokyo (JP)

( * ) Notice: Subject to any disclaimer, the term of this patent is extended or adjusted under 35 U.S.C. 154(b) by 11 days.

(21) Appl. No.: 13/817,948

(22) PCT Filed: Apr. 16, 2012

(86) PCT No.: PCT/JP2012/060259
§ 371 (c)(1),
(2), (4) Date: Feb. 20, 2013

(87) PCT Pub. No.: WO2012/157381
PCT Pub. Date: Nov. 22, 2012

(65) Prior Publication Data
US 2014/0188373 A1 Jul. 3, 2014

(30) Foreign Application Priority Data
May 18, 2011 (JP) .................................. 2011-111389

(51) Int. Cl.
*F02D 31/00* (2006.01)
*E02F 9/20* (2006.01)
(Continued)

(52) U.S. Cl.
CPC .............. *F02D 31/001* (2013.01); *B60W 10/06* (2013.01); *B60W 10/08* (2013.01); *B60W 20/00* (2013.01); *E02F 9/2075* (2013.01); *E02F 9/2292* (2013.01); *E02F 9/2296* (2013.01);
(Continued)

(58) Field of Classification Search
USPC .............. 701/22, 54, 101, 102, 110; 123/319, 123/350, 480, 492, 493; 180/65.21, 65.22, 180/65.225, 65.245, 65.25, 65.26; 903/902, 903/903, 904, 905, 906, 907
See application file for complete search history.

(56) References Cited

U.S. PATENT DOCUMENTS 4,627,013 A * 12/1986 Ichiyama et al. ............. 702/174
1,009,887 A1 4/2011 Koga et al.
(Continued)

FOREIGN PATENT DOCUMENTS

JP 2003-027985 A 1/2003
JP 2005-081973 A 3/2005
(Continued)

OTHER PUBLICATIONS

International Search Report dated Jul. 10, 2012, issued for PCT/JP2012/060259.

*Primary Examiner* — Stephen K Cronin
*Assistant Examiner* — Joshua A Campbell
(74) *Attorney, Agent, or Firm* — Locke Lord LLP

(57) ABSTRACT

It is determined that assisting is required when a deviation of a target matching engine speed and a current engine speed is equal to or more than a predetermined value, and for a predetermined period of time since the time point at which it is determined that assisting is required, a target assist engine speed is set at a high rotation target matching engine speed which is more than the target matching engine speed, and thereafter the target assist engine speed is set gradually closer to the target matching engine speed, and an assist torque command value is output to the generator assisting output of the engine, and the engine speed is controlled, so that the engine speed attains the target assist engine speed.

9 Claims, 24 Drawing Sheets

(51) Int. Cl.
*E02F 9/22* (2006.01)
*F02D 29/06* (2006.01)
*B60W 10/06* (2006.01)
*B60W 10/08* (2006.01)
*B60W 20/00* (2016.01)

(52) U.S. Cl.
CPC ............ *F02D 29/06* (2013.01); *B60W 2300/17* (2013.01); *B60W 2710/0644* (2013.01); *F02D 31/007* (2013.01); *Y02T 10/56* (2013.01); *Y02T 10/6286* (2013.01)

(56) References Cited

U.S. PATENT DOCUMENTS

| | | | |
|---|---|---|---|
| 8,534,264 B2* | 9/2013 | Kawaguchi et al. | 123/350 |
| 2004/0088103 A1* | 5/2004 | Itow et al. | 701/110 |
| 2009/0320461 A1* | 12/2009 | Morinaga et al. | 60/431 |
| 2010/0031650 A1* | 2/2010 | Morinaga et al. | 60/459 |
| 2010/0064677 A1* | 3/2010 | Kawaguchi et al. | 60/431 |
| 2010/0186713 A1* | 7/2010 | Kawaguchi et al. | 123/350 |
| 2011/0098873 A1* | 4/2011 | Koga et al. | 701/22 |
| 2012/0078477 A1* | 3/2012 | Takashiro | 701/52 |
| 2014/0148984 A1* | 5/2014 | Nishi et al. | 701/22 |
| 2014/0188373 A1* | 7/2014 | Kawaguchi et al. | 701/110 |

FOREIGN PATENT DOCUMENTS

| | | | |
|---|---|---|---|
| JP | 2007-218111 A | | 8/2007 |
| JP | 2007218111 A | * | 8/2007 |
| JP | 2008-049761 A | | 3/2008 |
| JP | 2010-173599 A | | 8/2010 |
| JP | 2011-047342 A | | 3/2011 |

* cited by examiner np1: TARGET MATCHING ENGINE SPEED
np1a: NO-LOAD ENGINE SPEED
np2: NO-LOAD MAXIMUM ENGINE SPEED
nm1: NO-LOAD MINIMUM ENGINE SPEED

ENGINE CONTROL DEVICE OF WORK MACHINE AND ENGINE CONTROL METHOD THEREFOR

CROSS REFERENCE TO RELATED APPLICATIONS

This application is related to co-pending application, entitled, "ENGINE CONTROL DEVICE OF WORK MACHINE AND ENGINE CONTROL METHOD THEREFOR" filed concurrently herewith in the names of Tadashi Kawaguchi, Takao Suehiro, Kentaro Murakami and Jun Morinaga as a national stage application of International Application No. PCT/JP2012/060382, filed Apr. 17, 2012, which application is assigned to the assignee of the instant application and which co-pending application is also incorporated by reference herein.

FIELD

The present invention relates to an engine control device of work machine including construction machines such as excavators, bulldozers, dump trucks, wheel loaders, and an engine control method therefor.

BACKGROUND

In an engine control such as a diesel engine (hereinafter, engine) used for a work machine, when an operator of the work machine sets a fuel adjustment dial (throttle dial) provided in a cab to any position, the engine controller outputs, to a fuel injection system, a control signal for injecting the amount of fuel injection in accordance with setting to the engine. The engine controller outputs a control signal in accordance with change of the load of the working machine attached to the work machine and adjusts the engine speed, so as to maintain the target engine speed set by the fuel adjustment dial (throttle dial). The engine controller or a pump controller calculates a target absorption torque of the hydraulic pump in accordance with the target engine speed. This target absorption torque is set such that the output horsepower of the engine matches the absorption horsepower of the hydraulic pump.

Ordinary engine control will be explained with reference to FIG. 26. The engine is controlled so as not to exceed an engine output torque line TL constituted by a maximum output torque line P1 of the engine and an engine droop line Fe subtracted from the maximum engine speed. For example, when the work machine is an excavator, the engine controller generates a control signal for changing the engine speed in accordance with rotation operation of the upper rotation body, the amount of manipulation of a manipulation lever manipulated for working machine operation, the load of the working machine, and the like. For example, when excavation operation of soil and the like is performed while the target engine speed is as N2, an engine speed (idling engine speed N1) while the engine is in idling operation is changed to a target engine speed N2. At this occasion, in response to the control signal from the engine controller, the fuel injection system injects fuel to the engine in accordance with this change, and when working machine operation and the like is performed to increase the load, the engine speed is changed so that the engine speed and the engine output torque reaches a matching point M1 corresponding to a crossing point of an engine output torque line TL and a pump absorption torque line PL of a variable displacement hydraulic pump (typically, swash plate hydraulic pump). At a rated point P, the engine output is the maximum.

In this case, in order to improve fuel-efficiency of the engine and the pump efficiency of the hydraulic pump, there is an engine control device as illustrated in FIG. 27, in which a target engine driving line (target matching route) ML passing a region where a fuel consumption rate is high is made, and a matching point of the engine output and the pump absorption torque is taken on this target matching route ML. In FIG. 27, a curved line M denotes an equal fuel-efficiency curved line of an engine and the like, and a point closer to the center of the curved line M (eye (M1)) is more advantageous in the fuel consumption rate. The curved line J denotes an equal horsepower curved line at which the horse power absorbed by the hydraulic pump is the equal horsepower. Therefore, in order to obtain a same horsepower, the fuel consumption rate is better if matching is obtained at the matching point pt2 on the target matching route ML as compared with the matching point pt1 on the engine droop line Fe. A flow rate Q of the hydraulic pump is a product of the engine speed n and a pump capacity q (Q=n·q), and in order to obtain a same operating oil flow rate, the pump efficiency is better when the engine speed is reduced and the pump capacity is increased.

CITATION LIST

Patent Literature

Patent Literature 1: Japanese Patent Application Laid-open No. 2007-218111

SUMMARY

Technical Problem

By the way, there is a construction machine such as a hybrid excavator which drives the upper swing body with the electric swing motor. In the hybrid excavator, electric power is provided (discharged) from an electric storage device such as a capacitor to this electric swing motor, so that the swing of the upper swing body is accelerated, and when the swing of the upper swing body is decelerated, electric power is provided (charged) to the capacitor using regeneration of the electric swing motor, thus achieving a lower fuel consumption rate than conventional excavators. Further, in response to the load of the working machine, the hybrid excavator activates electric power generation by an generator driven by the engine (turns on electric power generation), so that the electric power generated by the generator is provided (charged) to the capacitor, or the electric power generated by the generator is provided to accelerate the swing of the electric swing motor. The generator performs assist action to compensate the output of the engine in accordance with the load of the hybrid excavator, thus achieving a low fuel consumption rate.

In this case, as illustrated in FIG. 28, the engine speed before the start of the working machine operation is a matching point MP0 which is a low idling engine speed, and the load is light, and this is the state where the swash plate angle of the hydraulic pump is small, and the pump capacity is the minimum. When the working machine operation is started from this state, the pump capacity of the hydraulic pump cannot be immediately increased, and is increased gradually, and therefore, it is desired to immediately increase the engine speed to ensure the amount of the operation oil discharged from the hydraulic pump. For example, it is preferably increased to an engine speed close to a target no-load maximum engine speed np2 indicated by a region E1. However, in order to improve the fuel-efficiency and pump-efficiency, the target matching engine speed (target assist engine speed) np1 is controlled so that the engine speed becomes a low engine speed. Therefore, as the engine load increases, the engine speed reaches the target assist engine speed np1 and is stabilized before the engine speed sufficiently increases as illustrated in arrow A1. As a result, although the generator assists the engine, operating oil is not sufficiently provided from the hydraulic pump to a hydraulic actuator (hydraulic cylinder) of the working machine, and there is a problem in that the responsiveness of the working machine cannot be ensured sufficiently.

A method for solving the problem includes setting the target assist engine speed at a high level. for example, as illustrated in FIG. 29, when an engine speed np2' at a crossing point of the target matching route ML and the droop line DL drawn from the no-load maximum engine speed np2 is set as a target assist engine speed, the hydraulic pump is driven in accordance with the high engine speed, and the responsiveness of the working machine is improved. More specifically, as the engine load increases, the engine output changes from a matching point MP0 to a matching point MP4 as indicated by an arrow A2. However, the matching point MP4 at the target assist engine speed np2' is at a high output position, and the generator continues to assist the engine, and therefore, there is a problem in that useless energy corresponding to the torque increment ΔT is consumed.

This invention is made in view of the above problems, and it is an object of this invention to provide an engine control device of a work machine and an engine control method therefor which can sufficiently ensure responsiveness of a working machine with assist effect by a generator while improving the fuel and pump efficiency.

Solution to Problem

According to a first aspect of the present inventions in order to overcome the above problem and achieve the object, there is provided an engine control device of a work machine including: an engine; a generator for assisting an output of the engine; detection means for detecting an operation state of the work machine; no-load maximum engine speed calculation means for calculating, on the basis of the operation state, a no-load maximum engine speed which is an engine speed of the engine which can be attained at most when no load is applied; target matching engine speed calculation means for calculating, on the basis of the operation state, a target matching engine speed which is an engine speed of the engine which can be attained when a load is applied, wherein the target matching engine speed is calculated separately from the no-load maximum engine speed; engine target output calculation means for calculating, on the basis of the operation state, an engine target output which can be output at most;
engine control means for controlling an engine speed between the no-load maximum engine speed and the target matching engine speed under limitation of the engine target output; assist determination means for determining that assisting is required when a deviation of the target matching engine speed and a current engine speed is equal to or more than a predetermined value; and assist rotational speed setting means, wherein after it is determined that assisting is required, the assist engine speed setting means sets the target assist engine speed at a previously determined upper limit target assist engine speed more than the target matching engine speed, and thereafter sets the target assist engine speed gradually closer to the target matching engine speed, wherein the engine control means outputs an assist torque command value to the generator and controls the engine speed, so that the engine speed attains the target assist engine speed.

According to a second aspect of the present inventions, there is provided the engine control device of the work machine according to the first aspect, wherein for a predetermined time from the time point at which it is determined that the assisting is required, the assist engine speed setting means sets the target assist engine speed at an upper limit target assist engine speed, and after a predetermined time passes, the assist engine speed setting means sets the target assist engine speed such that the engine speed is reduced to the target matching engine speed with a predetermined engine speed reduction rate.

According to a third aspect of the present inventions, there is provided the engine control device of the work machine according to the first aspect further comprising load calculation means for calculating an engine load on the basis of a detection result of the detection means, wherein the assist engine speed setting means makes setting to reduce the target assist engine speed in accordance with increase of the engine load with the upper limit target assist engine speed or less.

According to a fourth aspect of the present inventions, there is provided the engine control device of the work machine according to any one of the first to third aspects, wherein the upper limit target assist engine speed is an engine speed at a crossing point of a target matching route and a droop line of the no-load maximum engine speed.

According to a fifth aspect of the present inventions, there is provided the engine control device of the work machine according to any one of the first to fourth aspects, wherein the predetermined value of the deviation is determined in accordance with an operation state of the work machine.

According to a sixth aspect of the present inventions, there is provided an engine control method of a work machine, including: detection step for detecting an operation state of the work machine; a no-load maximum engine speed calculation step for calculating, on the basis of the operation state, a no-load maximum engine speed which is an engine speed of the engine which can be attained at most when no load is applied; a target matching engine speed calculation step for calculating, on the basis of the operation state, a target matching engine speed which is an engine speed of the engine which can be attained when a load is applied, wherein the target matching engine speed is calculated separately from the no-load maximum engine speed; an engine target output calculation step for calculating, on the basis of the operation state, an engine target output which can be output at most; an engine control step for controlling an engine speed between the no-load maximum engine speed and the target matching engine speed under limitation of the engine target output; an assist determination step for determining that assisting is required when a deviation of the target matching engine speed and a current engine speed is equal to or more than a predetermined value; and an assist engine speed setting step, wherein after it is determined that assisting is required, the target assist engine speed is set at a previously determined upper limit target assist engine speed more than the target matching engine speed, and thereafter the target assist engine speed is set gradually closer to the target matching engine speed, wherein in the engine control step, an assist torque command value is output to the generator to assist output of the engine and the engine speed is controlled, so that the engine speed attains the target assist engine speed.

According to a seventh aspect of the present inventions, there is provided the engine control method of the work machine according to the sixth aspect, wherein in the assist engine speed setting step, for a predetermined time from the time point at which it is determined that the assisting is required, the target assist engine speed is set at an upper limit target assist engine speed, and after a predetermined time passes, the target assist engine speed is set such that the engine speed is reduced to the target matching engine speed with a predetermined engine speed reduction rate.

According to an eighth aspect of the present inventions, there is provided the engine control method of the work machine according to the sixth aspect further comprising a load calculation step for calculating an engine load on the basis of a detection result of the detection means, wherein in the assist engine speed setting step, setting is made to reduce the target assist engine speed in accordance with increase of the engine load with the upper limit target assist engine speed or less.

According to this invention, after it is determined that an engine is required to be assisted, a target assist engine speed is set at a previously determined upper limit target assist engine speed which is more than a target matching engine speed, and thereafter the target assist engine speed is set gradually closer to the target matching engine speed, and an assist torque command value is output to a generator, and the engine speed is controlled, so that the engine speed attains the target assist engine speed, and therefore, responsiveness of a working machine can be sufficiently ensured with assist effect by a generator while improving the fuel and pump efficiency.

DESCRIPTION OF EMBODIMENTS

Hereinafter, an embodiment for carrying out this invention will be explained with reference to appended drawings.

[Entire Configuration]

Figure 1:
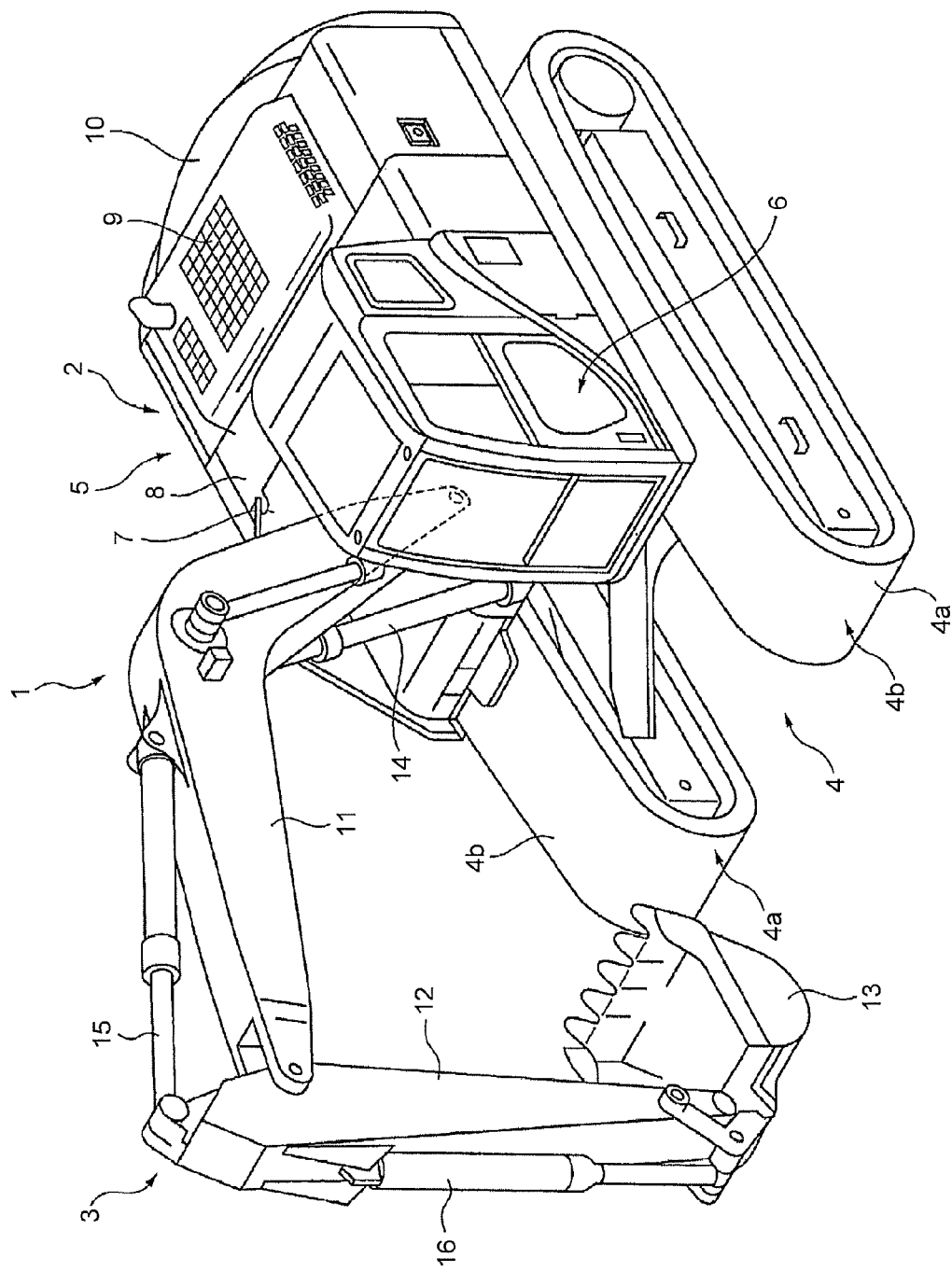
FIG. 1 is a perspective view illustrating entire configuration of a hybrid excavator according to an embodiment of this invention.
Figure 2:
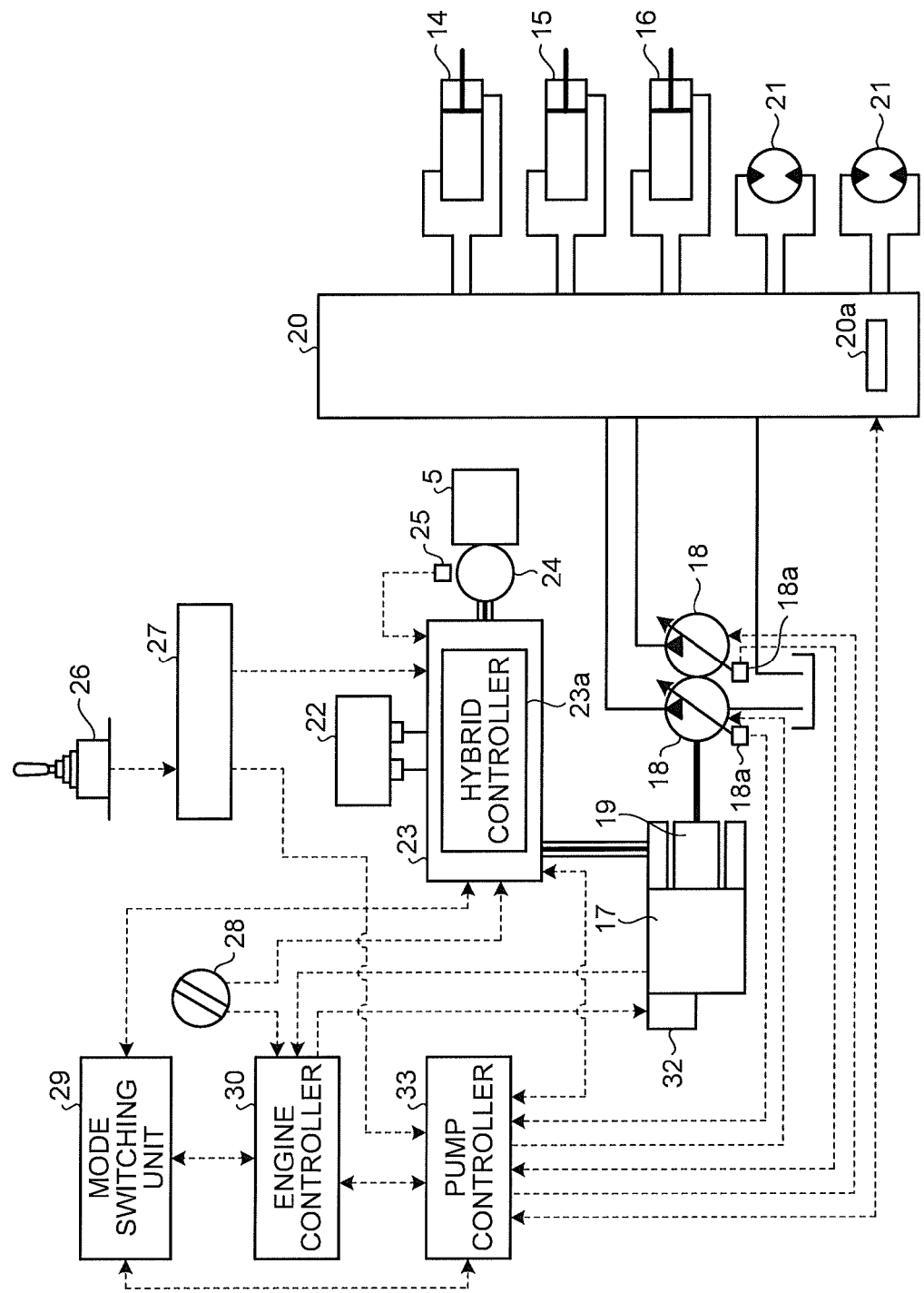
FIG. 2 is a schematic view illustrating a configuration of a control system of a hybrid excavator as illustrated in FIG. 1.

First, FIGS. 1 and 2 illustrate an entire configuration of a hybrid excavator 1 which is an example of a work machine. The hybrid excavator 1 includes a vehicle main body 2 and a working machine 3. The vehicle main body 2 includes a lower running body 4 and an upper swing body 5. The lower running body 4 includes a pair of running devices 4a. Each running device 4a includes a crawler track 4b. Each running device 4a runs or rotates the hybrid excavator 1 by driving the crawler track 4b with a right running motor and a left running motor (running motors 21).

The upper swing body 5 is rotatably provided on the lower running body 4, and rotates when a swing motor 24 drives it. The upper swing body 5 is provided with a cab 6. The upper swing body 5 includes a fuel tank 7, an operating oil tank 8, an engine chamber 9 and a counter weight 10. The fuel tank 7 accumulates fuel for driving an engine 17. The operating oil tank 8 accumulates operating oil which is discharged from a hydraulic pump 18 to a hydraulic cylinder such as a boom cylinder 14 and a hydraulic device such as the running motor 21. The engine chamber 9 accommodates devices such as the engine 17 and the hydraulic pump 18. The counter weight 10 is provided behind the engine chamber 9.

The working machine 3 is attached to a central position at the front of the upper swing body 5, and includes a boom 11, an arm 12, a bucket 13, the boom cylinder 14, an arm cylinder 15, and a bucket cylinder 16. The base end portion of the boom 11 is coupled with the upper swing body 5 in a rotatable manner. The front end portion of the boom 11 is coupled with the base end portion of the arm 12 in a rotatable manner. The front end portion of the arm 12 is coupled with the front end portion of the bucket 13 in a rotatable manner. The boom cylinder 14, the arm cylinder 15, and the bucket cylinder 16 are hydraulic cylinders driven with operating oil discharged from the hydraulic pump 18. The boom cylinder 14 operates the boom 11. The arm cylinder 15 operates the arm 12. The bucket cylinder 16 operates the bucket 13.

In FIG. 2, the hybrid excavator 1 includes the engine 17 serving as a driving source, the hydraulic pump 18, and a generator 19. A diesel engine is used as the engine 17, and a variable displacement hydraulic pump (for example, swash plate hydraulic pump) is used as the hydraulic pump 18. The output shaft of the engine 17 is mechanically coupled with the hydraulic pump 18 and the generator 19, and by driving the engine 17, the hydraulic pump 18 and the generator 19 are driven. It should be noted that the generator 19 may be directly mechanically coupled with the output shaft of the engine 17, or may be rotated and driven via transmission means such as a belt and a chain engaged with the output shaft of the engine 17. The hydraulic driving system includes a control valve 20, the boom cylinder 14, the arm cylinder 15, the bucket cylinder 16, the running motor 21, and the like, and the hydraulic pump 18 serves as a hydraulic source to drive them.

The electric driving system includes a capacitor 22, an inverter 23, and the swing motor 24. The electric power generated by the generator 19 or electric power discharged by the capacitor 22 is provided via an electric power cable to the swing motor 24, which rotates the upper swing body 5. More specifically, the swing motor 24 performs power running action with electric energy provided from (generated by) the generator 19 or electric energy provided by (discharged by) the capacitor 22, thereby performs swing and driving, and when the swing is decelerated, the swing motor 24 performs regeneration action to provide the electric energy to the capacitor 22 (charge the capacitor 22). For example, an SR (switched reluctance) motor is used as the generator 19. The generator 19 is mechanically coupled with the output shaft of the engine 17, and the engine 17 drives and rotates the rotor shaft of the generator 19. For example, an electric double-layer capacitor is used as the capacitor 22. Instead of the capacitor 22, it may be a Nickel-metal hydride battery or a lithium-ion battery. The swing motor 24 is provided with a rotation sensor 25, which detects rotation speed of the swing motor 24, converts it into an electric signal, and outputs the electric signal to a hybrid controller 23a provided within the inverter 23. For example, an interior magnet synchronous motor is used as the swing motor 24. For example, a rotary encoder, a resolver, or the like are used as the rotation sensor 25. The hybrid controller 23a includes, e.g., a CPU (operation device such as a numeric data processor) and a memory (storage device). The hybrid controller 23a receives signals of detection values provided by a temperature sensor such as a thermistor or a thermocouple provided in the generator 19, the swing motor 24, the capacitor 22, and the inverter 23 to manage increase and decrease of the temperature of each device such as the capacitor 22, and performs charge/discharge control of the capacitor 22, electric power generation and engine assist control of the generator 19, and running and regeneration control of the swing motor 24.

The hydraulic driving system and the electric driving system are driven in accordance with manipulation of a manipulation lever 26 such as a working machine lever, a running lever, and a swing lever, provided in the cab arranged in the vehicle main body 2. The amount of manipulation of the manipulation lever 26 is converted by a lever manipulation amount detection unit 27 into an electric signal. The lever manipulation amount detection unit 27 is constituted by a pressure sensor. A pilot hydraulic pressure generated in accordance with manipulation of the manipulation lever is detected by a pressure sensor, and a voltage and the like that is output by the pressure sensor is converted into the amount of manipulation of the lever, whereby the amount of manipulation of the lever is obtained. The amount of manipulation of the lever is output to a pump controller 33 as an electric signal. When the manipulation lever 26 is an electric lever, the lever manipulation amount detection unit 27 is constituted by electric detection means such as a potentiometer, and the voltage and the like generated in accordance with the amount of manipulation of the lever is converted into the amount of manipulation of the lever, and the amount of manipulation of the lever is obtained.

A fuel adjustment dial (throttle dial) 28 and a mode switching unit 29 are provided in the cab 6. The fuel adjustment dial (throttle dial) 28 is a switch for setting the amount of fuel provided into the engine 17, and the setting value of the fuel adjustment dial (throttle dial) 28 is converted into an electric signal and output to an engine controller 30.

The engine controller 30 is constituted by an operation device such as a CPU (numeric data processor) and a memory (storage device). The engine controller 30 generates a signal of a control command on the basis of the setting value of the fuel adjustment dial (throttle dial) 28, and a common rail control unit 32 receives the control signal, and adjusts the amount of fuel injection to the engine 17. More specifically, the engine 17 is an engine capable of electronic control by common rail method, and can give an output for appropriately control the amount of fuel injection, and can freely set the torque that can be output at an engine speed at a certain instance.

The mode switching unit 29 is a portion for setting the work mode of the hybrid excavator 1 to power mode or economy mode, and for example, the mode switching unit 29 is constituted by a manipulation button, a switch, or a touch panel provided in the cab 6. When the operator of the hybrid excavator 1 manipulates the manipulation button and the like, the mode switching unit 29 can switch the work mode. The power mode is a work mode for performing engine control and pump control in such a manner that the fuel-efficiency is reduced while a large amount of work is maintained. The economy mode is a work mode for performing engine control and pump control so as to ensure the operation speed of the working machine 3 during light-load operation while the fuel-efficiency is still more reduced. In the setting with the mode switching unit 29 (switching of the work mode), the electric signal is output to the engine controller 30 and the pump controller 33. In the power mode, the output of the engine 17 and the absorption torque of the hydraulic pump 18 are matched with each other in a region where the engine speed and the output torque of the engine 17 is relatively high. In the economy mode, matching is achieved at a lower engine output as compared with the case of the power mode.

The pump controller 33 receives signals transmitted from the engine controller 30, the mode switching unit 29, and the lever manipulation amount detection unit 27, and generates a signal of a control command for adjusting the amount of the operation oil discharged from the hydraulic pump 18 by controlling inclination of the a swash plate angle. The pump controller 33 receives a signal from a swash plate angle sensor 18a for detecting the swash plate angle of the hydraulic pump 18. By causing the swash plate angle sensor 18a to detect the swash plate angle, the pump capacity of the hydraulic pump 18 can be calculated. Within the control valve 20, a pump-pressure detection unit 20a is provided to detect the pump discharge pressure of the hydraulic pump 18. The detected pump discharge pressure is converted into an electric signal and input into the pump controller 33. The engine controller 30 and the pump controller 33 are connected via a vehicle LAN such as a CAN (Controller Area Network) so as to exchange information with each other.

[Overview of Engine Control]

Figure 3:
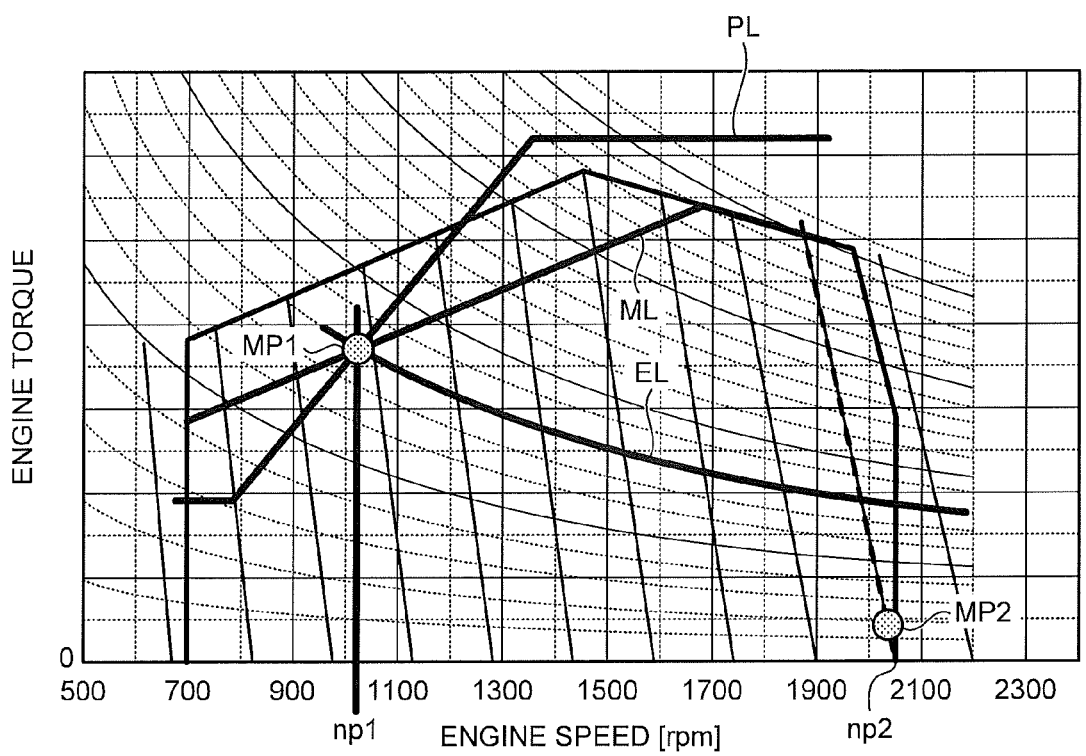
FIG. 3 is a torque line diagram for explaining the contents of engine control by a controller.

First, overview of the engine control will be explained with reference to a torque line diagram as illustrated in FIG. 3. The engine controller 30 obtains information about the amount of manipulation of the lever, work mode, rotation speed, the setting value of the fuel adjustment dial (throttle dial) 28 (signals indicating the state of driving), and obtains the engine output command value. The engine output command value is the equal horsepower curved line (engine output command value curved line) EL in the torque line diagram, and is a curved line for limiting the output of the engine.

When the working machine 3 is not receiving any load, the engine output is not restricted by the droop line, and the engine output and the hydraulic pump output are matched at the crossing point (matching point) MP1 between the engine output command value curved line EL and the pump absorption torque line PL, whereby the working machine 3 is operated. The matching point MP1 is preferably on the target matching route ML. The engine speed at the target matching point MP1 is a target matching engine speed np1, and for example, in FIG. 3, it is around 1000 rpm. Therefore, the working machine 3 can obtain sufficient output, and can reduce the fuel consumption since the engine 17 is driven at a low engine speed.

On the other hand, when the load to the working machine 3 is lost, and the operating oil flow rate to the hydraulic cylinders 14, 15, 16 of the working machine 3 is required, i.e., when the operation speed of the working machine 3 is required to be ensured, the engine controller 30 determines a no-load maximum engine speed np2 (for example, in FIG. 3, around 2050 rpm) corresponding to information such as the amount of manipulation of the lever, the rotation rotational speed of the upper swing body 5, and the setting value of the fuel adjustment dial (throttle dial) 28, and drives the engine 17 by controlling the engine droop within the engine speed range between the target matching engine speed np1 and the no-load maximum engine speed np2. When, by doing such control, the state where the load of the working machine 3 is imposed is changed to the state where no load is imposed, the matching point MP1 at the low rotation side changes to the matching point MP2 at the high rotation side, and therefore, the operating oil flow rate discharged from the hydraulic pump 18 can be sufficiently provided to the hydraulic cylinders 14, 15, 16, and the operation speed of the working machine 3 can be ensured. Since the engine output is limited by the engine output command value curved line EL, useless energy is not wasted. It should be noted that the no-load maximum engine speed np2 is not limited to the maximum engine speed that the engine can output.

Figure 4:
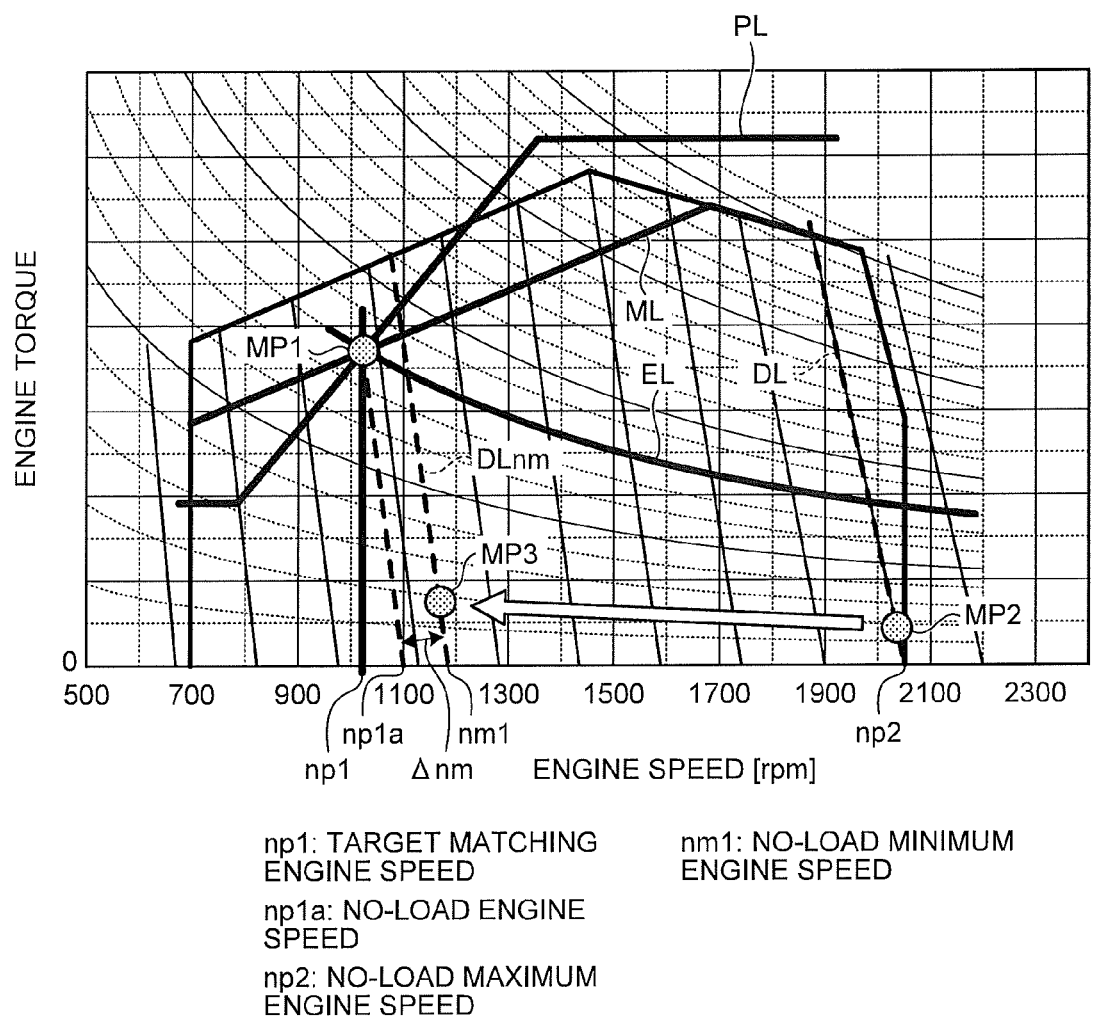
FIG. 4 is a torque line diagram for explaining the contents of engine control by the controller.

In this case, if the load of the working machine 3 is further lost, the engine continuously driven at a high rotation region would consume more fuel, which reduces the fuel-efficiency. Therefore, when the load is lost, and for example, a high discharge flow rate and a high discharge pressure of the operating oil from the hydraulic pump 18 are not required like the operation with only the bucket 13, i.e., the pump capacity is sufficient, control is performed to shift the droop line DL in the high rotation region to the low rotation region as illustrated in FIG. 4. As described above, the pump capacity is detected by the swash plate angle sensor 18a, and the droop line is shifted in accordance with the magnitude of the detection value. For example, when the pump capacity is detected as being more than a predetermined time, the operating oil flow rate is required and therefore, the droop line DL is shifted to the high rotation side to increase the engine speed, and when the pump capacity is detected as being less than the predetermined time, the operating oil flow rate is not required, and therefore, the droop line DL is shifted to the low rotation side to decrease the engine speed. By doing such control, useless fuel consumption due to driving of the engine at the high rotation side can be suppressed.

[Details of Engine Control]

Figure 5:
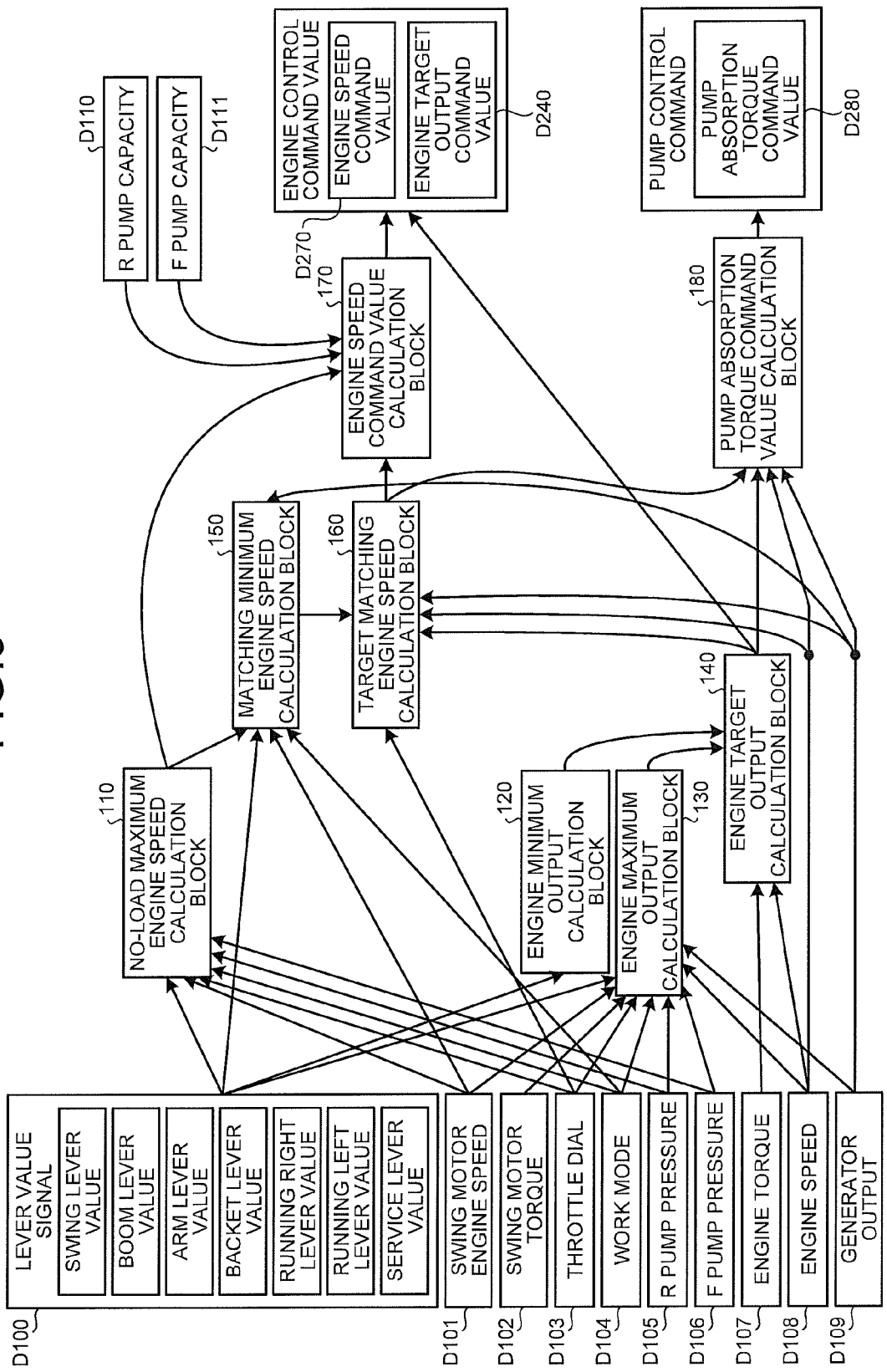
FIG. 5 is a diagram illustrating an overall control flow by the controller.

FIG. 5 illustrates an overall control flow by the engine controller 30 or the pump controller 33. The engine controller 30 or the pump controller 33 ultimately calculates the engine speed command value and the engine output command value which are engine control commands, and calculates the pump absorption torque command value as a pump control command.

Figure 6:
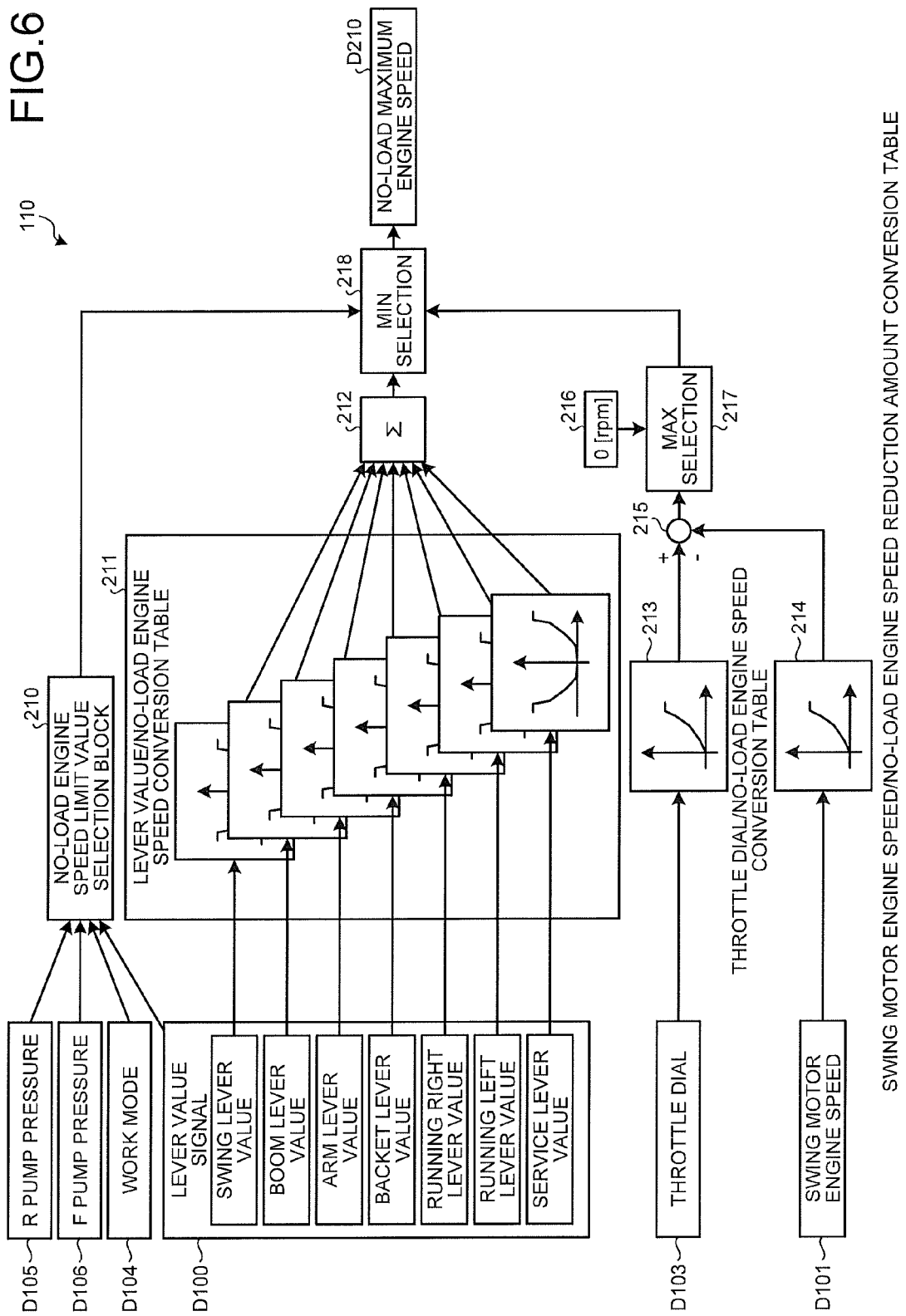
FIG. 6 is a diagram illustrating a detailed control flow of a no-load maximum engine speed calculation block as illustrated in FIG. 5.

A no-load maximum engine speed calculation block 110 calculates, in accordance with the detailed control flow as illustrated in FIG. 6, a no-load maximum engine speed D210 (np2) which is a value of the upper limit value of the engine speed command value. When the pump capacity of the hydraulic pump 18 is the maximum, the flow rate of the hydraulic pump 18 (hydraulic pump discharge flow rate) is a product of the engine speed and the pump capacity, and since the flow rate of the hydraulic pump 18 (hydraulic pump discharge flow rate) is proportional to the engine speed, a no-load maximum engine speed D210 and the flow rate of the hydraulic pump 18 (pump maximum discharge amount) are in proportional relationship. Therefore, first, as a candidate value of the no-load maximum engine speed D210, a total summation of engine speeds obtained from each lever value signal D100 (the amount of manipulation of the lever) is obtained by a total summation unit 212. Each lever value signal D100 (each signal indicating the amount of manipulation of the lever) includes a swing lever value, a boom lever value, an arm lever value, a bucket lever value, a running right lever value, a running left lever value, and a service lever value. This service lever value is a value means a value indicating the amount of manipulation of the lever for manipulating a new hydraulic actuator when a hydraulic circuit is provided to be connected to the new hydraulic actuator. Each lever value signal is converted into a no-load engine speed by a lever value/no-load engine speed conversion table 211 as illustrated in FIG. 6, and a no-load engine speed of the total summation obtained by the total summation unit 212 based on this converted value is output to a minimum value selection unit (MIN selection) 218.

On the other hand, no-load engine speed limit value selection block 210 uses the amount of manipulation of each manipulation lever value signal D100, pump-pressures D105, D106 which are discharge pressures of the hydraulic pump 18, and the work mode D104 set by the mode switching unit 29 to determine what kind of manipulation pattern (work pattern) the operator of the hybrid excavator 1 is currently executing, and selects and determines a no-load engine speed limit value for the manipulation pattern set in advance. The no-load engine speed limit value thus determined is output to the minimum value selection unit 218. The determination of the manipulation pattern (work pattern) is such that, for example, in a case where the arm lever is inclined in the excavation direction, and the pump-pressure is also higher than a certain setting value, the hybrid excavator 1 is determined to execute heavy excavation work, and in a case of a composite manipulation where, e.g., the swing lever is inclined and the boom lever is inclined in an upward direction, the hybrid excavator 1 is determined to execute hoist swing work. As described above, the determination of the manipulation pattern (work pattern) is estimation of the manipulation that is executed by the operator at that moment. It should be noted that the hoist swing work is a work in which earth and sand excavated by the bucket 13 is raised with the boom 11 raised, and the upper swing body 5 is swung, and the earth and sand in the bucket 13 is discharged at a desired rotation stop position.

On the other hand, the candidate value of the no-load maximum engine speed is determined also from the setting state (setting value) of the fuel adjustment dial 28 (throttle dial D103). More specifically, upon receiving a signal indicating the setting value of the fuel adjustment dial 28 (throttle dial D103), the setting value is converted into a candidate value of a no-load maximum engine speed by a throttle dial/ no-load engine speed conversion table 213 and is output to the minimum value selection unit 218.

In this case, the hybrid excavator 1 having the electric swing motor 24 does not need any hydraulic pressure as the driving source of rotation. For this reason, among the operating oil discharged from the hydraulic pump 18, the operating oil discharge flow rate from the hydraulic pump 18 for driving the rotation may be reduced. Therefore, a no-load engine speed reduction amount obtained by a swing motor engine speed/no-load engine speed reduction amount conversion table 214 from a swing motor engine speed D101 is subtracted by a subtraction unit 215 from the no-load engine speed obtained by the throttle dial/no-load engine speed conversion table 213 from the setting value of the fuel adjustment dial 28 (throttle dial D103), and the obtained engine speed is adopted as a candidate value of the no-load maximum engine speed D210. It should be noted that a maximum value selection unit (MAX selection) 217 is as follows: the maximum value selection unit 217 performs maximum value selection with a zero value 216 so as not to give a negative value to the minimum value selection unit 218, so that the following case is prevented: when the no-load engine speed reduction amount is more than the no-load maximum engine speed obtained from the setting value of the fuel adjustment dial 28 (throttle dial D103), the value given to the maximum value selection unit 217 becomes a negative value, and the no-load maximum engine speed becomes a negative value as a result of passing the minimum value selection unit (MIN selection) 218 for performing comparison with the no-load engine speed limit value that is output by the no-load engine speed limit value selection block 210.

The minimum value selection unit 218 selects the minimum value from the three values of the no-load engine speeds obtained from the setting value of the throttle dial D103 in view of the no-load engine speed obtained from the lever value signal D100, the no-load engine speed limit value obtained by the no-load engine speed limit value selection block 210, and the no-load engine speed limit value obtained from the swing motor engine speed D101, and outputs the no-load maximum engine speed D210 (np2).

Figure 7:
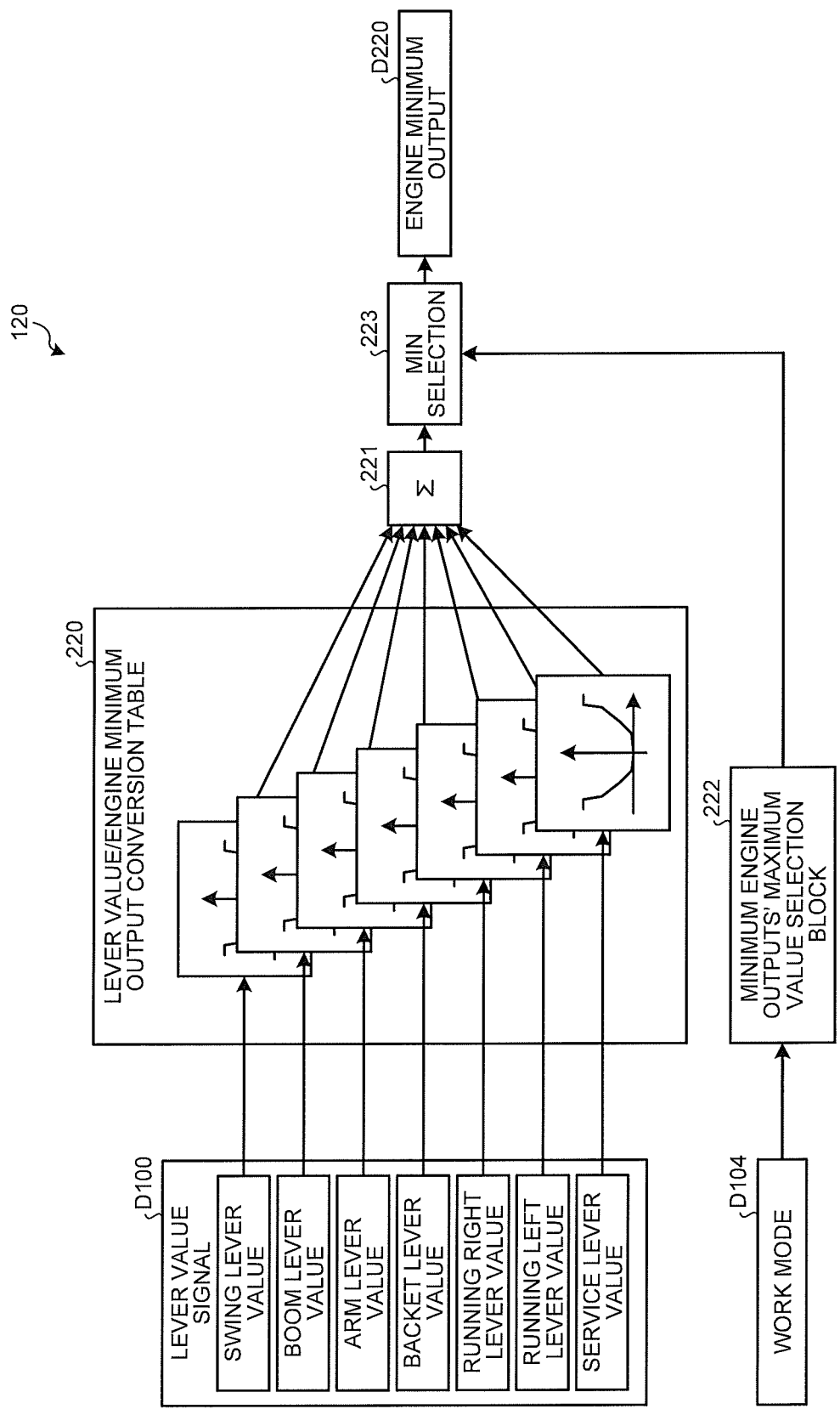
FIG. 7 is a diagram illustrating a detailed control flow of an engine minimum output calculation block as illustrated in FIG. 5.

FIG. 7 is a detailed control flow of an engine minimum output calculation block 120. As illustrated in FIG. 7, the engine minimum output calculation block 120 calculates an engine minimum output D220 which is the value of the minimum of the engine output command value. Like the calculation of the no-load maximum engine speed, a lever value engine minimum output conversion table 220 converts each lever value signal D100 into an engine minimum output, and the total summation unit 221 outputs the total summation thereof to a minimum value selection unit (MIN selection) 223.

On the other hand, a maximum value selection block 222 of the engine minimum output outputs an upper limit value corresponding to the work mode D104 set by the mode switching unit 29 to the minimum value selection unit 223. The minimum value selection unit 223 compares the total summation of the engine minimum output corresponding to each lever value signal D100 and the upper limit value corresponding to the work mode D104, and selects the minimum value and outputs it as the engine minimum output D220.

Figure 8:
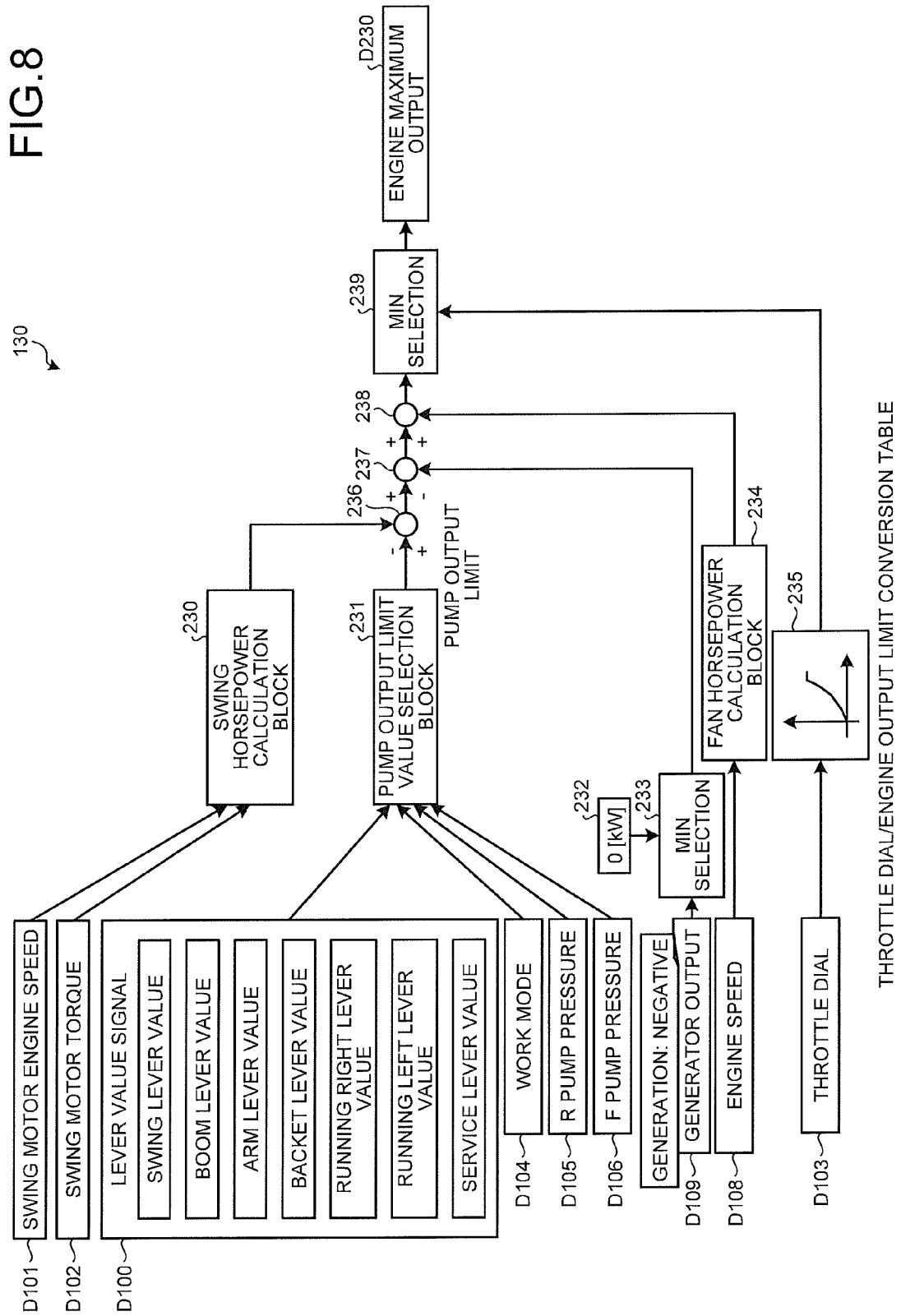
FIG. 8 is a diagram illustrating a detailed control flow of an engine maximum output calculation block as illustrated in FIG. 5.

FIG. 8 is a detailed control flow of an engine maximum output calculation block 130. As illustrated in FIG. 8, the engine maximum output calculation block 130 calculates an engine maximum output D230 which is a value of the upper limit of the engine output command value. Like the calculation of the no-load maximum engine speed calculation block 110, a pump output limit value selection block 231 uses information about the amount of manipulation of each lever value signal D100, the pump-pressures D105, D106, and the setting value of the work mode D104 of the work mode D104 to determine the current manipulation pattern, and selects the pump output limit value for each manipulation pattern thereof. This selected pump output limit value is added by an adding unit 238 with a fan horsepower calculated by a fan horsepower calculation block 234 from the engine speed D108 detected by the engine speed sensor, not illustrated. Using the swing motor rotational speed D101 and the swing motor torque D102 as input parameters, and a swing horsepower calculation block 230 calculates the swing horsepower, and using the engine speed D108, the fan horsepower calculation block 234 calculates the fan horsepower. The swing horsepower and the fan horsepower are added to a pump output limit value via each of the subtraction unit 237 and the adding unit 238, respectively. The generator output D109 of the generator 19 is added to the pump output limit value via the subtraction unit 237. These added values (hereinafter, added values) and the engine output limit value converted by a throttle dial/engine output limit conversion table 235 in accordance with the setting value of the fuel adjustment dial 28 (throttle dial D103) are output to the minimum value selection unit (MIN selection) 239. The minimum value selection unit 239 selects the minimum value of the added values and the engine output limit value, and outputs it as the engine maximum output D230.

It should be noted that the swing horsepower can be obtained by calculating the following expression, swing horsepower (kW)=2π÷60×swing motor rotational speed× swing motor torque÷1000×coefficient (setting value). It should be noted that the fan is a fan provided in proximity to a radiator for cooling the engine 17, and the fan blows air to the radiator, and is rotated and driven in synchronization with driving of the engine 17. It should be noted that the fan horsepower can be obtained by simplified calculation using the following expression, fan horsepower=fan rated horsepower×(engine speed/engine speed when the fan is at rated speed)^3. It should be noted that the swing horsepower and the generator output are added to the pump output limit value is subtraction as illustrated in FIG. 8. The hybrid excavator 1 uses the swing motor 24 electrically driven by the driving source of electricity, which is different from the driving source of the engine 17, and therefore, it is necessary to obtain the swing horsepower and subtract the value of the swing from the pump output limit value. When the generator 19 generates electric power, the generator output is defined such that the value has a negative sign, and the minimum value selection unit 233 compares it with the zero value 232, and a negative value is subtracted from the pump output limit value, and therefore, this is substantially addition. When the generator 19 assists the output of the engine 17, the value of the generator output has a positive sign. When the generator 19 generates electric power, the generator output is a negative value, and therefore, after the minimum value selection with the zero value 232 is performed, the negative generator output is subtracted from the pump output limit, and the generator output is substantially added to the pump output limit. More specifically, only when the generator output D109 is a negative value, addition is performed. The generator 19 assists the engine 17 in order to enhance the responsiveness of the working machine 3 when it is necessary to increase the engine speed from a predetermined engine speed to a higher engine speed, but when the output for assisting the engine 17 is omitted as the engine output at this moment, the responsiveness of the working machine 3 is not achieved, and therefore, even though the engine 17 is assisted, the engine maximum output is not reduced.

More specifically, even if the positive generator output is input into the minimum value selection unit 233, the minimum value selection with the zero value 232 is done, whereby zero is output from the minimum value selection unit 233, and the engine maximum output D230 is obtained without subtraction from the pump output limit is not done.

Figure 9:
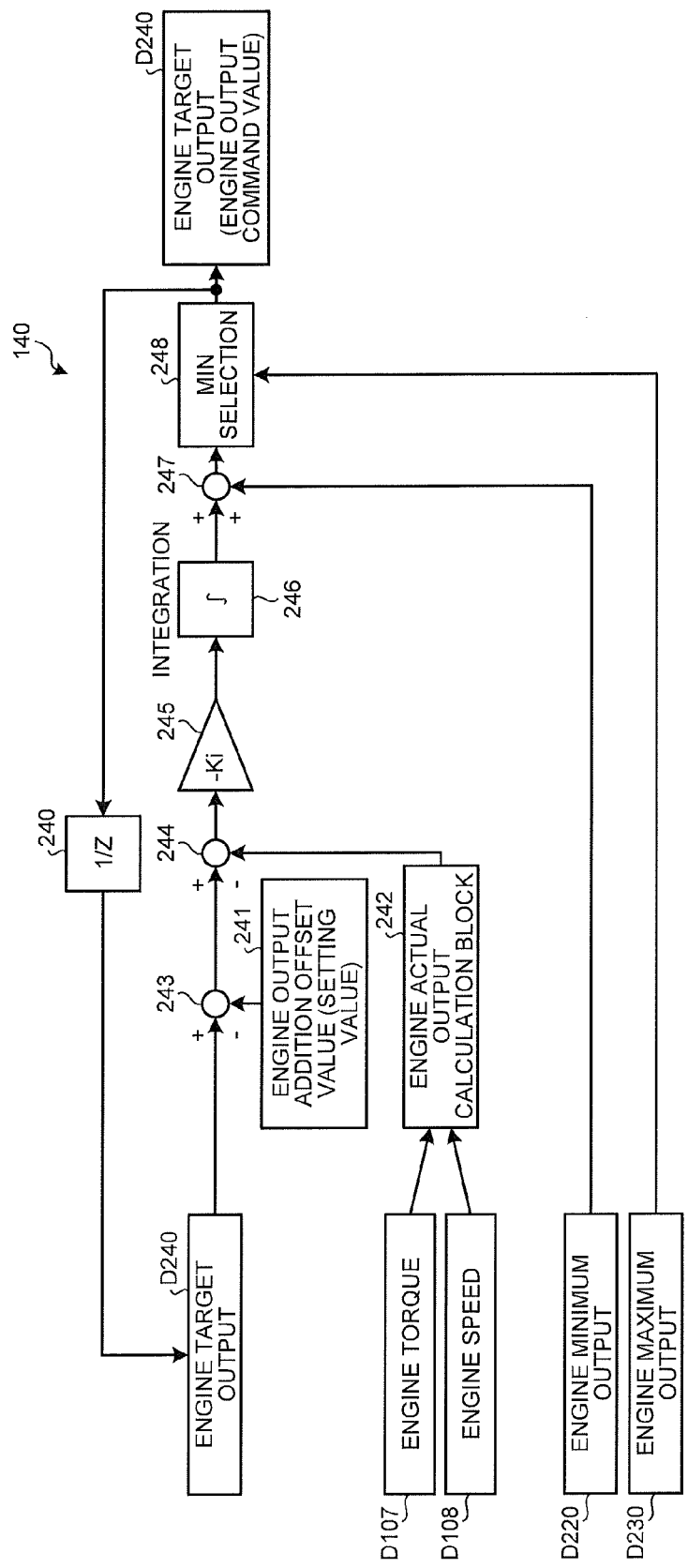
FIG. 9 is a diagram illustrating a detailed control flow of an engine target output calculation block as illustrated in FIG. 5.

FIG. 9 is a detailed control flow of the engine target output calculation block 140. As illustrated in FIG. 9, the engine target output calculation block 140 calculates the engine target output D240. A subtraction unit 243 subtracts an engine output addition offset value 241 set as a fixed value from the previous engine target output D240 previously calculated. A subtraction unit 244 obtains a deviation that is obtained by subtracting an engine actual output calculated by an engine actual output calculation block 242 from this subtracted value. A multiplication unit 245 multiplies this deviation by a value which is obtained by multiplying a certain gain (−Ki), and an integration unit 246 integrates this multiplied value. An adding unit 247 adds the engine minimum output D220, which is obtained and calculated by the engine minimum output calculation block 120, to the integration value. A minimum value selection unit (MIN selection) 248 outputs a minimum value of any one of the added value and the engine maximum output D230 obtained and calculated by the engine maximum output calculation block 130, and outputs the minimum value as the engine target output D240. As illustrated in FIG. 5, the engine target output D240 is used as the engine output command value of the engine control command, and the engine target output D240 means the engine output command value curved line EL as illustrated in FIG. 3 or 4. The engine actual output calculation block 242 performs calculation based on the amount of fuel injection and the engine speed commanded by the engine controller 30, the engine torque D107 predicted from an atmospheric temperature and the like, the engine speed D108 detected by an engine speed sensor, not illustrated, using the following expression, engine actual output (kW)=2π÷60×engine speed×engine torque÷1000, and obtains the engine actual output.

Figure 10:
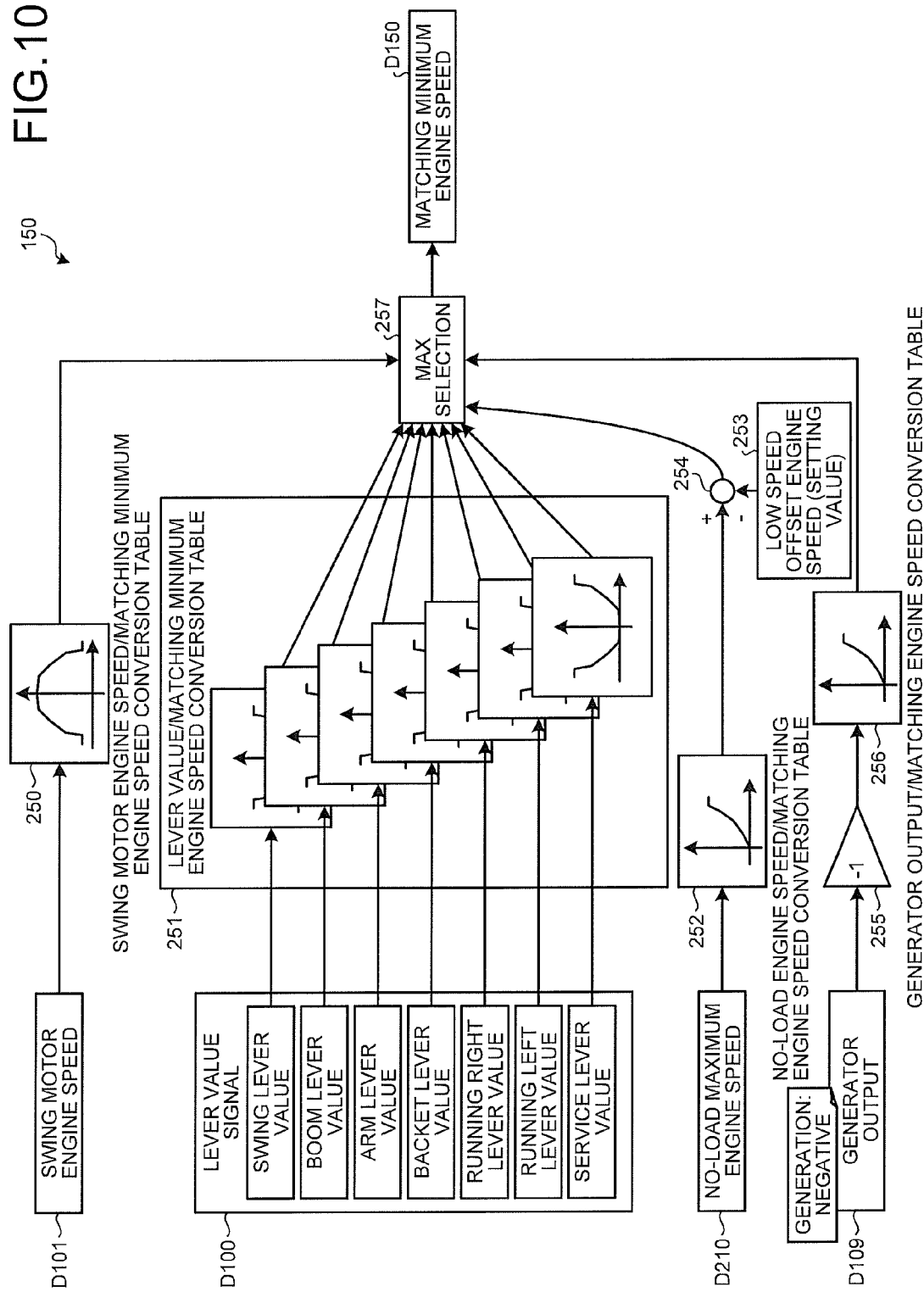
FIG. 10 is a diagram illustrating a detailed control flow of a matching minimum engine speed calculation block as illustrated in FIG. 5.

FIG. 10 is a detailed control flow of a matching minimum engine speed calculation block 150. As illustrated in FIG. 10, the matching minimum engine speed calculation block 150 calculates a matching minimum engine speed D150 which is the engine speed that should be at least increased during work. The matching minimum engine speed D150 is such that each value obtained by converting each lever value signal D100 with a lever value/matching minimum engine speed conversion table 251 is adopted as a candidate value of the matching minimum engine speed D150, which is output to each maximum value selection unit (MAX selection) 257.

Figure 14:
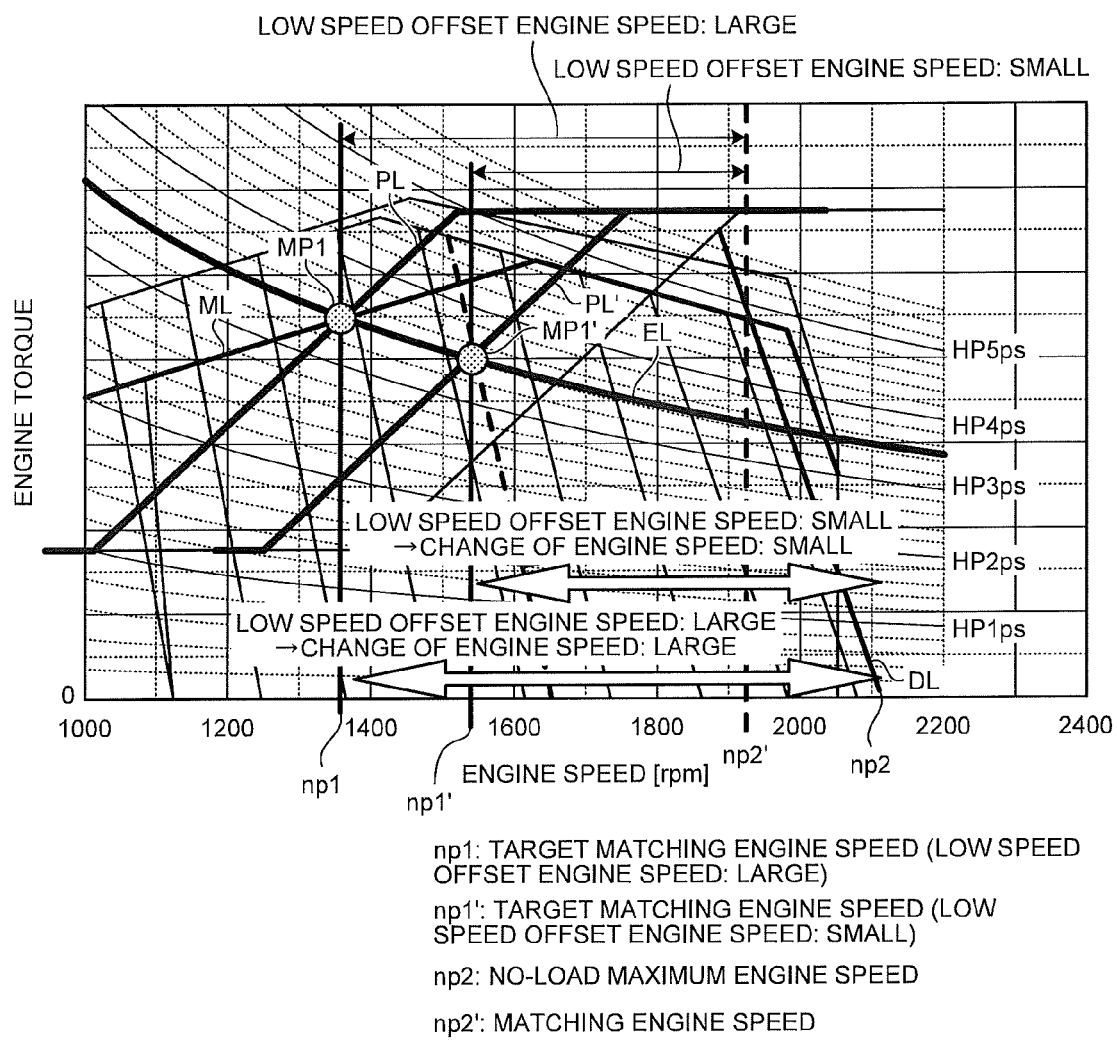
FIG. 14 is a torque line diagram for explaining the contents of engine control by a controller.

On the other hand, a no-load engine speed/matching engine speed conversion table 252 is such that, like the target matching engine speed np1, the engine speed at the crossing point of the droop line DL and the target matching route ML crossing at the no-load maximum engine speed np2 is adopted as a matching engine speed np2', and the no-load maximum engine speed D210 (np2) obtained by the no-load maximum engine speed calculation block 110 is converted and output (see FIG. 14). Further, a low speed offset engine speed is subtracted from the matching engine speed np2', and the value obtained as the result is output to the maximum value selection unit (MAX selection) 257 as a candidate value of the matching minimum engine speed D150. The reason why the low speed offset engine speed is used and the magnitude of the value will be explained later in detail.

A swing motor engine speed/matching minimum engine speed conversion table 250 is such that the swing motor engine speed D101 is converted as a candidate value of the matching minimum engine speed D150 and is output to the maximum value selection unit 257. The swing motor engine speed D101 is a value obtained by detecting the swing motor engine speed (speed) of the swing motor 24 of FIG. 2 using a rotation sensor such as a resolver and a rotary encoder. As illustrated in FIG. 10, the swing motor engine speed/matching minimum engine speed conversion table 250 is such that when the swing motor engine speed D101 is zero, the matching minimum engine speed is increased, and the conversion of the swing motor engine speed D101 is performed in such characteristics that as the swing motor engine speed D101 increases, the matching minimum engine speed is decreased.

In this case, the generator 19 has setting of the limitation value of the torque that can be output at the maximum (generator maximum torque), and therefore, in order to generate electric power with a certain degree of high output, it is necessary to increase the engine speed. For this reason, the engine speed that should be at least increased is obtained using a generator output/matching engine speed conversion table 256 from the magnitude of the generator output that is required as necessary, and this engine speed thus obtained is output to the maximum value selection unit (MAX selection) 257 as a candidate value of the matching minimum engine speed D150. Since the generator output D109 is negative, a gate 255 provided at a stage downstream of the generator output D109 is provided to convert the generator output D109 to a positive value.

The maximum value selection unit 257 selects the maximum value of these matching minimum engine speeds, and outputs it as the matching minimum engine speed D150.

In this case, when the load is lost in this embodiment, the engine speed increases to the no-load maximum engine speed np2 at most, and when the load is sufficiently applied, the engine speed decreases to the target matching engine speed np1. In this case, the engine speed is greatly changed in accordance with the magnitude of the load. The operator of the hybrid excavator 1 may feel uncomfortable with this great change of the engine speed (feeling of lack of power) as if the power of the hybrid excavator 1 is not obtained. Therefore, as illustrated in FIG. 14, the sense of discomfort can be removed by changing the width of change of the engine speed in accordance with the magnitude of the low speed offset engine speed thus set, using the low speed offset engine speed. More specifically, when the low speed offset engine speed is decreased, the width of change of the engine speed is decreased, and when the low speed offset engine speed is increased, and the width of change of the engine speed is increased. Even if the width of change of the engine speed is the same, how the operator feels uncomfortable may be different in accordance with the state of operation of the hybrid excavator 1 such as the state of rotation of the upper swing body 5 and the state of excavation work of the working machine 3. As compared with a state where the working machine 3 is doing excavation work, in a state where the upper swing body 5 is swung, the operator is less likely to feel that the power is insufficient even if the engine speed is somewhat reduced, and therefore, in the state where the upper swing body 5 is swung, no problem would be caused by setting the engine speed at a level lower than the state where the working machine 3 is doing excavation work. In this case, the engine speed decreases, and therefore, the fuel-efficiency is improved. This is not limited to only the swing, and such setting of the width of change of the engine speed can also be achieved in accordance with operation of other actuators.

Figure 27:
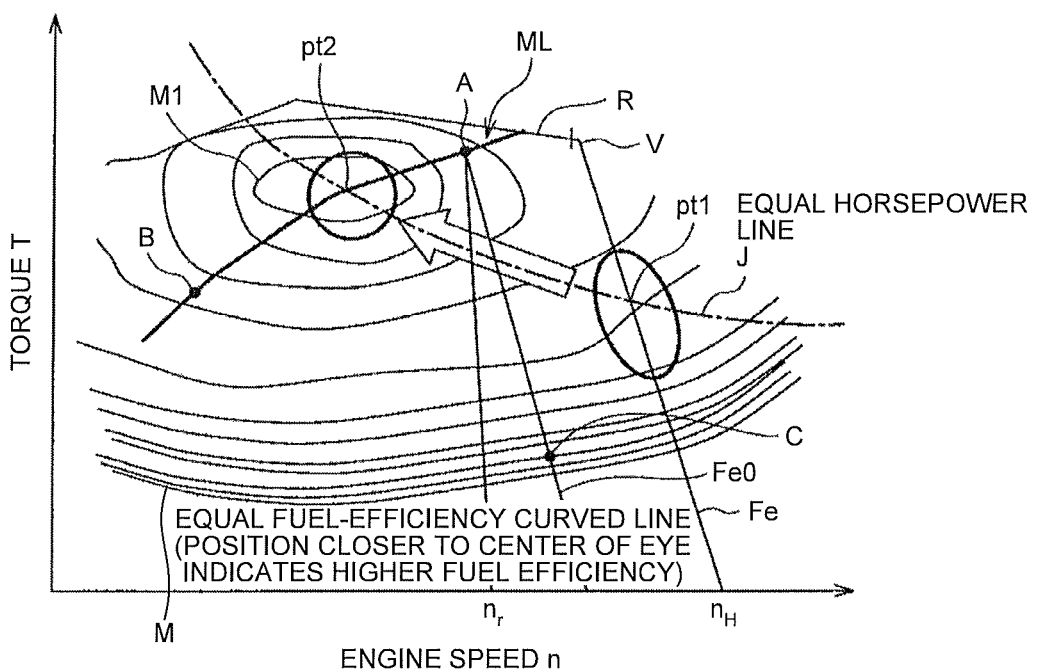
FIG. 27 is a torque line diagram for explaining conventional engine control using target matching route.
Figure 28:
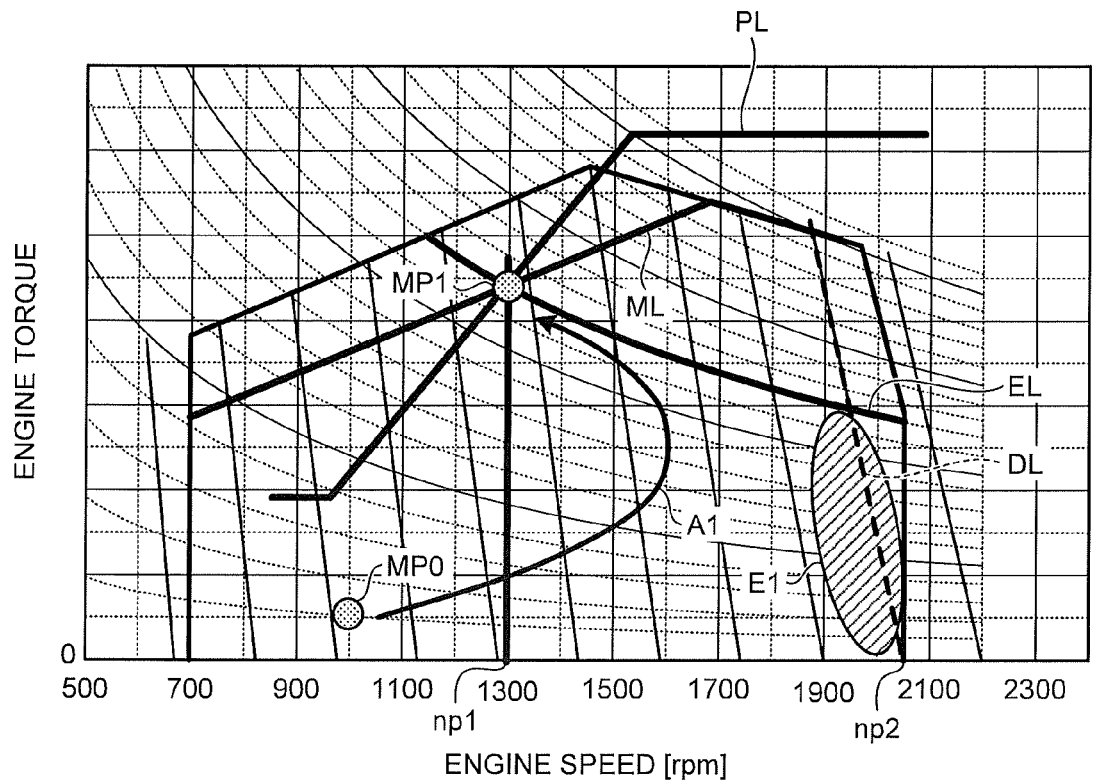
FIG. 28 is a torque line diagram illustrating an operation point of an engine in accordance with conventional assist control when working machine operation starts.
Figure 29:
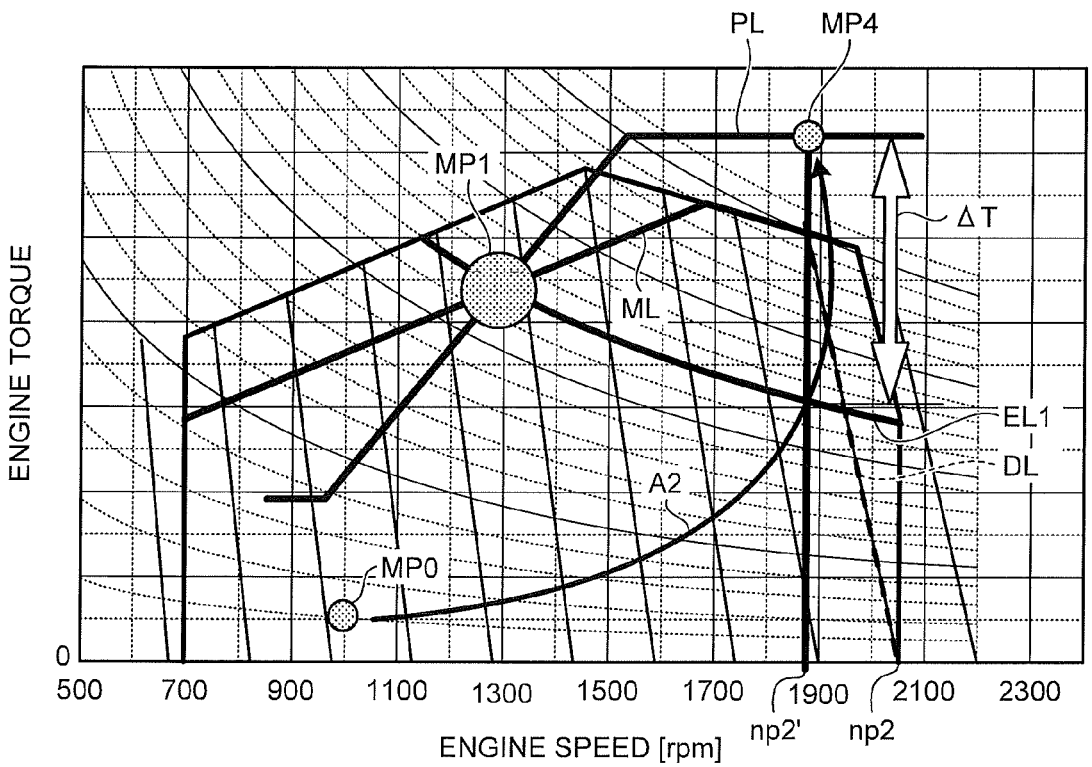
FIG. 29 is a torque line diagram illustrating an operation point of an engine in accordance with another conventional assist control when working machine operation starts.

The torque line diagram as illustrated in FIG. 14 will be explained as a supplementary explanation. HP1 to HP5 in the graph as illustrated in FIG. 14 correspond to the equal horsepower line J as illustrated in FIG. 27, and ps denotes a horsepower unit (ps), and the horsepower increases from HP1 to HP5, and five curved lines are illustrated as examples. The equal horsepower curved line (engine output command value curved line) EL is obtained and set in accordance with the engine output command value required. Therefore, the equal horsepower curved line (engine output command value curved line) EL is not limited to five cases of HP1 to HP5, and numerous number of lines exist, and selection is made therefrom. FIG. 14 illustrates a case where the equal horsepower curved line (engine output command value curved line) EL of which horsepower is a horsepower between HP3$ps$ and HP4$ps$ is obtained and set.

Figure 11:
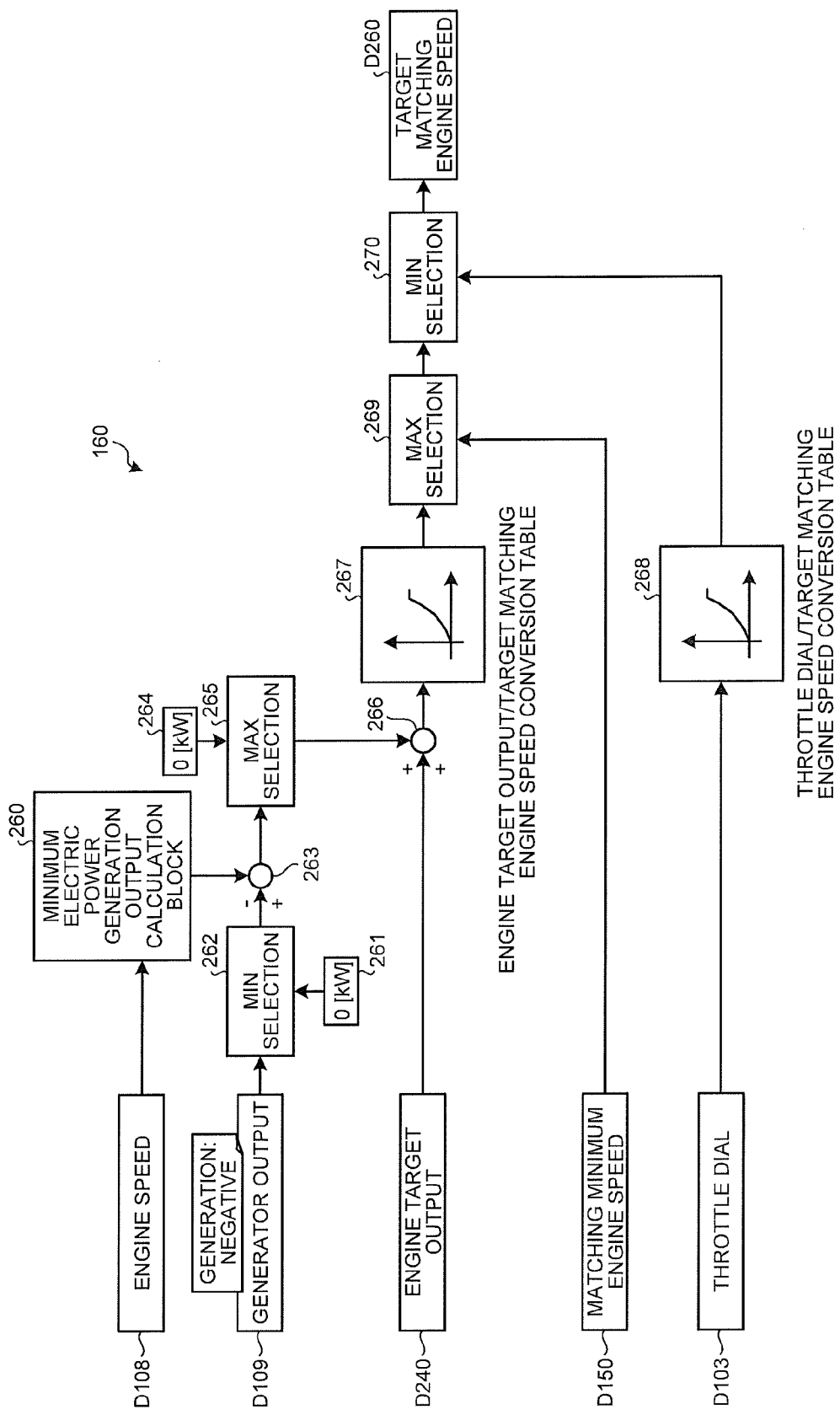
FIG. 11 is a diagram illustrating a detailed control flow of a target matching engine speed calculation block as illustrated in FIG. 5.

FIG. 11 is a detailed control flow of a target matching engine speed calculation block 160. As illustrated in FIG. 11, the target matching engine speed calculation block 160 calculates the target matching engine speed np1 (D260) as illustrated in FIG. 3. The target matching engine speed D260 is an engine speed where the engine target output D240 (engine output command value curved line EL) and the target matching route ML cross. The target matching route ML is set to pass points where the fuel consumption rate is high when the engine 17 operates with a certain level of engine output, and therefore, the target matching engine speed D260 is preferably determined at a crossing point on this target matching route ML with the engine target output D240. For this reason, an engine target output/target matching engine speed conversion table 267 is such that the engine target output D240 (engine output command value curved line EL) obtained by the engine target output calculation block 140 is received, and the target matching engine speed at the crossing point of the engine target output D240 (engine output command value curved line EL) and the target matching route ML is obtained, and is output to a maximum value selection unit (MAX selection) 269.

However, according to the operation performed by the matching minimum engine speed calculation block 150 as illustrated in FIG. 10, when the width of change of the engine speed is reduced, the matching minimum engine speed D150 is more than the matching engine speed obtained by the engine target output/target matching engine speed conversion table 267. For this reason, the maximum value selection unit (MAX selection) 269 compares the matching minimum engine speed D150 and the matching engine speed obtained from the engine target output D240, and selects the maximum value and adopts it as a candidate value of the target matching engine speed D260, thereby limiting the lower limit of the target matching engine speed. In FIG. 14, when the low speed offset engine speed is small, the target matching point is not MP1 but is MP1' although out of the target matching route ML, and the target matching engine speed D260 is not np1 but is np1'. Like the no-load maximum engine speed D210 obtained by the no-load maximum engine speed calculation block 110, the upper limit of the target matching engine speed D260 is limited also by the setting value of the fuel adjustment dial 28 (throttle dial D103). More specifically, a throttle dial/target matching engine speed conversion table 268 is such that the setting value of the fuel adjustment dial 28 (throttle dial D103) is received, and a candidate value of the target matching engine speed D260 converted into the matching engine speed of the crossing point of the target matching route ML and the droop line corresponding to the setting value of the fuel adjustment dial 28 (throttle dial D103) (droop line that can be drawn from the engine speed corresponding to the setting value of the fuel adjustment dial 28 (throttle dial D103) on the torque line diagram) is output, and the candidate value of the target matching engine speed D260 thus output and the candidate value of the target matching engine speed D260 selected by the maximum value selection unit 269 are compared by a minimum value selection unit (MIN selection) 270, and the minimum value is selected, so that the ultimate target matching engine speed D260 is output.

In this case, the target matching engine speed D260 is basically the engine speed at the crossing point of the engine target output and the target matching route ML, but as illustrated in FIG. 8, the engine maximum output D230 is a value obtained by adding the fan horsepower and the generator output to the pump output limit value, and using this engine maximum output D230, the engine target output D240 is determined as illustrated in FIG. 9. Further, as illustrated in FIG. 11, the engine target output D240 is input into the target matching engine speed calculation block 160, and the target matching engine speed D260 is determined. The value of the target matching engine speed D260 is changed in accordance with the generator output D109 requested by the generator 19.

In this case, the generator 19 is not efficient when electric power is generated with a small electric power generation torque. For this reason, when the generator 19 generates electric power, the generator 19 is controlled to generate electric power with a torque equal to or more than the minimum electric power generation torque set in advance. As a result, when the generator 19 changes the state from the state where the generator 19 does not generate electric power (electric power generation OFF) to the state where the generator 19 generates electric power (electric power generation ON), the ON/OFF state of the electric power generation is switched at the minimum electric power generation torque, and the generator output discontinuously changes. More specifically, the matching point is determined at the crossing point of the engine target output D240 and the target matching route ML, and therefore, in accordance with discontinuous change of the generator output D109, target matching engine speed D260 greatly changes with the switching of the ON/OFF state of the electric power generation.

For this reason, the target matching engine speed calculation block 160 is such that, a minimum electric power generation output calculation block 260 uses the engine speed D108 to calculate the following expression, minimum electric power generation output (kW)=2π÷60×engine speed× minimum electric power generation torque (value is a negative setting value)÷1000, and the minimum electric power generation output is obtained, and when the required generator output is less than the minimum electric power generation output thus sought, the output that is not sufficient for the minimum electric power generation output is added to the engine target output by the adding unit 266, and using the added engine target output, it is calculated as a candidate value of the target matching engine speed with the engine target output/target matching engine speed conversion table 267, so that the change of the rotational speed due to the ON/OFF state of the electric power generation ON/OFF is prevented. When there is no required generator output (when, e.g., the output of the engine 17 is to be assisted), the minimum value selection unit (MIN selection) 262 at a stage downstream of the generator output D109 performs comparison with the zero value 261 for zero output. Therefore, nothing is added to the engine target output D240. The maximum value selection unit (MAX selection) 265 is such that, when the required generator output is equal to or more than the minimum electric power generation output, the minimum electric power generation output is not insufficient, and therefore, it is not necessary to perform addition to the engine target output D240. Therefore, a negative value is input into the maximum value selection unit 265, and zero which is the maximum value is selected in the comparison with the zero value 264, and the maximum value selection unit 265 outputs zero.

Figure 12:
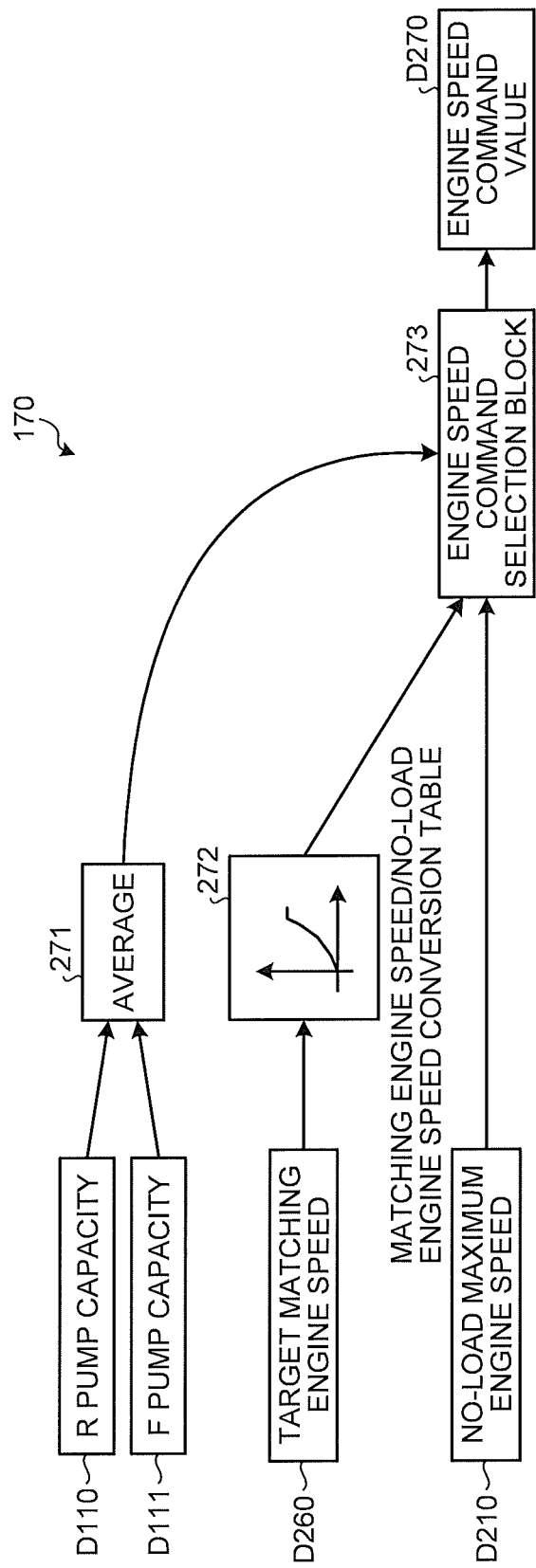
FIG. 12 is a diagram illustrating a detailed control flow of an engine speed command value calculation block as illustrated in FIG. 5.

FIG. 12 is a detailed control flow of an engine speed command value calculation block 170. Hereinafter, explanation will be made with reference to the torque line diagram as illustrated in FIG. 4. As illustrated in FIG. 12, the engine speed command value calculation block 170 is such that, on the basis of the pump capacities D110, D111 obtained based on the swash plate angles detected by the swash plate angle sensors 18*a* of the two hydraulic pumps 18, an average unit 271 calculates an average pump capacity obtained by averaging the pump capacities D110, D111, and in accordance with the magnitude of the average pump capacity, an engine speed command selection block 273 obtains an engine speed command value D270 (no-load maximum engine speed np2). More specifically, the engine speed command selection block 273 is such that, when the average pump capacity is more than a certain setting value (threshold value), the engine speed command value D270 is brought closer to the no-load maximum engine speed np2 (D210). More specifically, the engine speed is increased. On the other hand, when the average pump capacity is less than a certain setting value, it is brought closer to an engine speed nm1 explained later, i.e., the engine speed is reduced. An engine speed corresponding to a position where the engine torque is zero along the droop line from the crossing point of the torque on the target matching point MP1 and the target matching engine speed np1 (D260) is adopted as a no-load engine speed np1*a*, and the engine speed nm1 is obtained as a value obtained by adding a lower limit engine speed offset value Δnm to the no-load engine speed np1*a*. It should be noted that the conversion into the no-load engine speed corresponding to the target matching engine speed D260 is made by a matching engine speed/no-load engine speed conversion table 272. Therefore, the engine speed command value D270 is determined between the no-load minimum engine speed nm1 and the no-load maximum engine speed np2 in accordance with the state of the pump capacity. The lower limit engine speed offset value Δnm is a value set in advance, and is stored in the memory of the engine controller 30.

This will be explained more specifically. When the average pump capacity is more than a certain setting value q_com1, the engine speed command value D270 is brought closer to the no-load maximum engine speed np2, and when the average pump capacity is less than the certain setting value q_com1, it is brought closer to the obtained value using the following expression, engine speed command value D270=engine speed np1*a* obtained by converting target matching engine speed np1 into no-load engine speed+lower limit engine speed offset value Δnm. The droop line can be controlled by the engine speed command value D270 thus obtained, and when the pump capacity is sufficient (when the average pump capacity is less than a certain setting value), the engine speed can be reduced (engine speed is set as nm1 (no-load minimum engine speed)) as illustrated in FIG. 4, and the fuel-efficiency can be improved while suppressing the fuel consumption. The setting valueq_com1 is a value set in advance, and is stored to the memory of the pump controller 33. It should be noted that the setting valueq_com1 has two setting values both for the engine speed increase side and the engine speed decrease side, and a range may be set in which the engine speed does not change.

Figure 13:
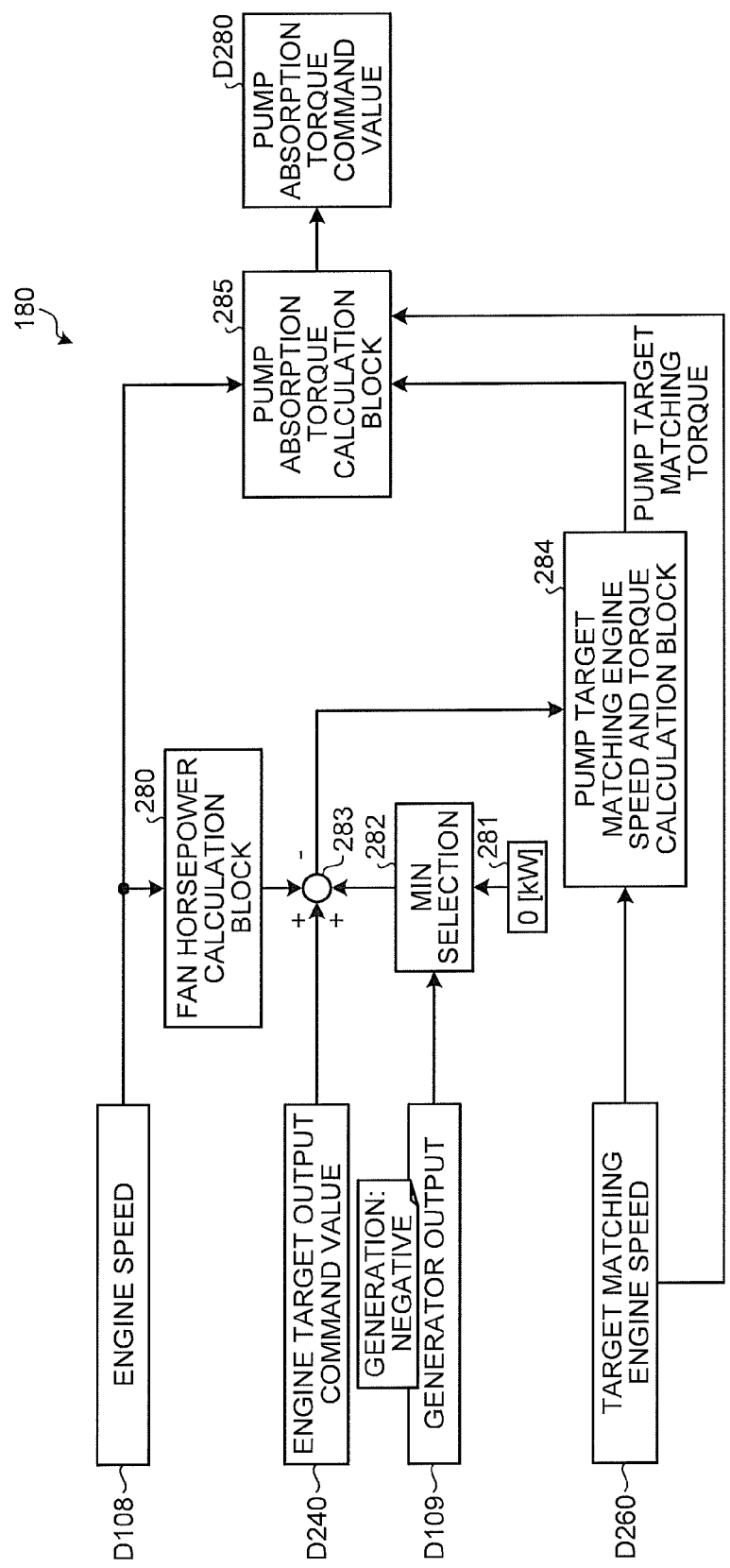
FIG. 13 is a diagram illustrating a detailed control flow of a pump absorption torque command value calculation block as illustrated in FIG. 5.

FIG. 13 is a detailed control flow of a pump absorption torque command value calculation block 180. As illustrated in FIG. 13, the pump absorption torque command value calculation block 180 uses the current engine speed D108, the engine target output D240, and the target matching engine speed D260 to obtain a pump absorption torque command value D280. A fan horsepower calculation block 280 uses the engine speed D108 to calculate the fan horsepower. It should be noted that the fan horsepower is obtained using an expression explained above. The subtraction unit 283 inputs the output obtained by subtracting the fan horsepower thus obtained from the engine target output D240 obtained by the engine target output calculation block 140 (pump target absorption horsepower) into a pump target matching engine speed and torque calculation block 284. In this case, the output obtained by subtracting not only the fan horsepower but also the generator output D109 from the engine target output D240 (pump target absorption horsepower) is output to the pump target matching engine speed and torque calculation block 284. The value of the required generator output has a negative sign, and therefore, the minimum value is selected in the comparison with a zero value 281 by a minimum value selection unit (MIN selection) 282, and the selected value is added to the engine target output D240 by the operation unit 283, and this substantially means that the generator output D109 is subtracted from the engine target output D240.

Further, this target matching engine speed and torque calculation block 284 receives the target matching engine speed D260 obtained by the target matching engine speed calculation block 160. The target matching engine speed D260 is the target matching engine speed of the hydraulic pump 18 (pump target matching engine speed). Then, the pump target matching engine speed and torque calculation block 284 calculates as shown in the following expression, pump target matching torque=(60×1000×(engine target output−fan horsepower))/ (2π×target matching engine speed). The obtained pump target matching torque is output to a pump absorption torque calculation block 285.

The pump absorption torque calculation block 285 receives the pump target matching torque which is output from the pump target matching engine speed and torque calculation block 284, the engine speed D108 detected by the rotation sensor, and the target matching engine speed D260. The pump absorption torque calculation block 285 calculates as shown in the following expression, pump absorption torque=pump target matching torque−Kp×(target matching engine speed−engine speed), and outputs the pump absorption torque command value D280 as a result of calculation. In this case, Kp denotes a control gain.

Such control flow is executed, whereby when the actual engine speed D108 is more than the target matching engine speed D260, the pump absorption torque command value D280 increases as can be understood from the above expression, and on the contrary, when the actual engine speed D108 is less than the target matching engine speed D260, the pump absorption torque command value D280 decreases. On the other hand, the output of the engine is controlled so that the engine target output D240 attains the upper limit, and therefore, as a result, the engine speed is such that the engine 17 is driven stably at an engine speed in proximity to the target matching engine speed D260.

Figure 15:
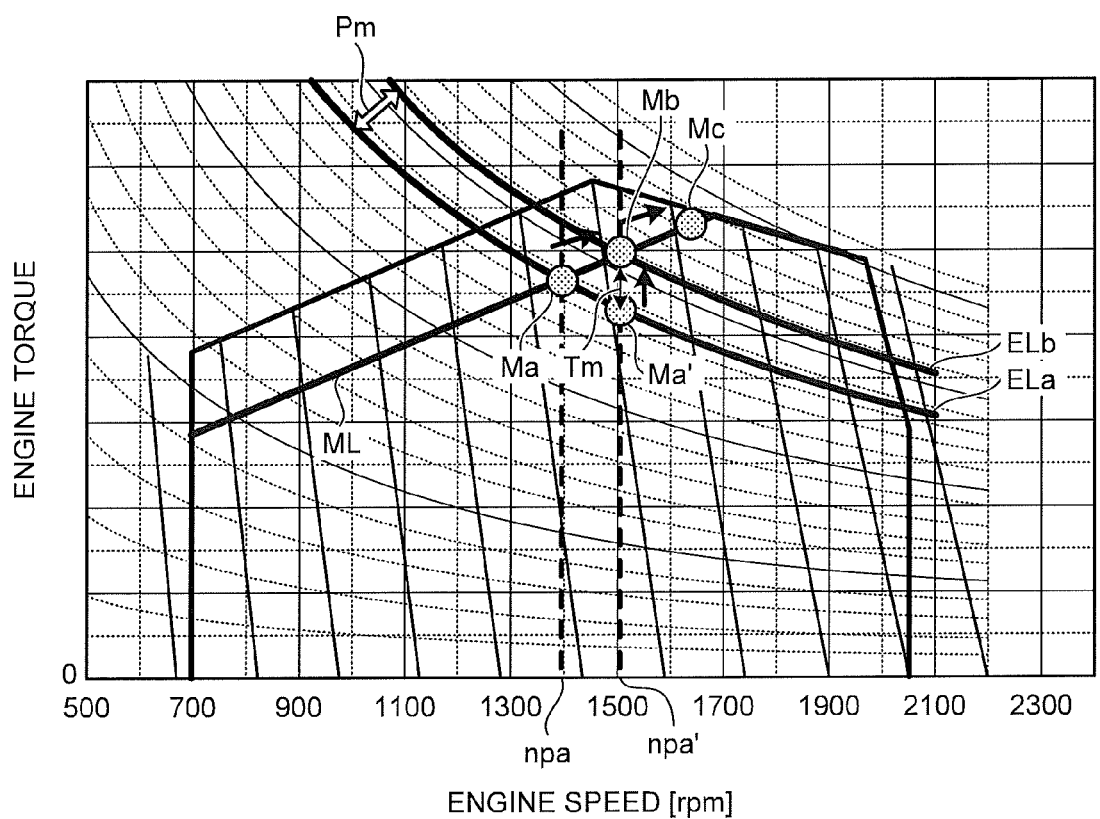
FIG. 15 is a torque line diagram illustrating setting state of the target matching engine speed when the electric power generation is turned ON/OFF.

In this case, as illustrated in FIG. 15, the target matching engine speed D260 calculated by the target matching engine speed calculation block 160 explained above is such that, when the electric power generation is OFF, a crossing point of the target matching route ML and the engine output command value curved line ELa indicating the engine target output D240 when the electric power generation is OFF is a target matching point Ma, and the target matching engine speed D260 is a target matching engine speed npa at that moment. When electric power generation is performed with the minimum electric power generation output Pm, an engine output command value curved line ELb indicating the engine target output D240 satisfying the minimum electric power generation output Pm is used, and a crossing point of the engine output command value curved line ELb and the target matching route ML is a target matching point Mb, and the target matching engine speed D260 is a target matching engine speed npa' at that moment.

When the engine control as illustrated in FIG. 11 is not performed, the actual electric power generation output is small with electric power generation less than the minimum electric power generation output Pm, and therefore, transition between the target matching points Ma, Mb frequently occurs due to the ON/OFF of the electric power generation, and at that occasion, the target matching engine speed frequently changes. In this embodiment, when the electric power generation is less than the minimum electric power generation output Pm, the target matching engine speed is set as npa' in advance when the electric power generation is OFF, and the target matching engine speed does not change due to the ON/OFF of the electric power generation. Then, when the electric power generation is OFF, the target matching point is a crossing point Ma' between the engine output command value curved line ELa and the target matching engine speed npa'. Therefore, when the engine control as illustrated in FIG. 11 is not performed, the matching point changes as follows: Ma→Mb→Mc, in accordance with the increase of the generator output, but in this embodiment, the matching point changes as follows: Ma'→Mb→Mc, in accordance with the increase of the generator output, and when the generator output is such a level that the ON/OFF of the electric power generation is switched (transition of the ON/OFF state of the electric power generation), the target matching engine speed does not change, the operator of the hybrid excavator 1 does not feel uncomfortable.

In the engine speed command value calculation block 170, as described above, the minimum value of the engine speed command value D270 is a value obtained by calculation of: engine speed command value=engine speed np1a obtained by converting target matching engine speed np1 into no-load engine speed+lower limit engine speed offset value Δnm, and the droop line of the engine with respect to the target matching engine speed is set at a high engine speed at least in view of the lower limit engine speed offset value Δnm. Therefore, according to the present embodiment, even when the actual absorption torque (pump actual absorption torque) of the hydraulic pump 18 somewhat varies with respect to the pump absorption torque command, the matching is achieved within a range away from the droop line, and even when the matching engine speed of the engine 17 somewhat changes, the engine output is limited on the engine output command value curved line EL, and the engine target output is controlled to be a certain level, and therefore, even when the actual absorption torque (pump actual absorption torque) varies with respect to the pump absorption torque command, variation of the engine output can be reduced. As a result, variation of the fuel-efficiency can also be reduced, and the specification of the fuel-efficiency of the hybrid excavator 1 can be satisfied. The specification of the fuel-efficiency is, for example, the fuel-efficiency can be reduced 10% as compared with a conventional hybrid excavator.

Figure 16:
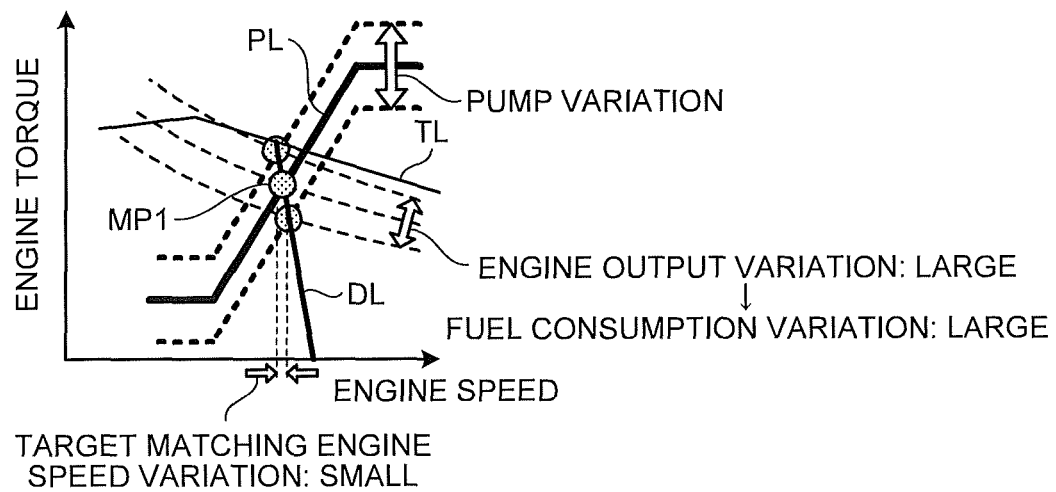
FIG. 16 is a torque line diagram illustrating the state of variation of engine output due to variation of a pump, in conventional engine control.
Figure 17:
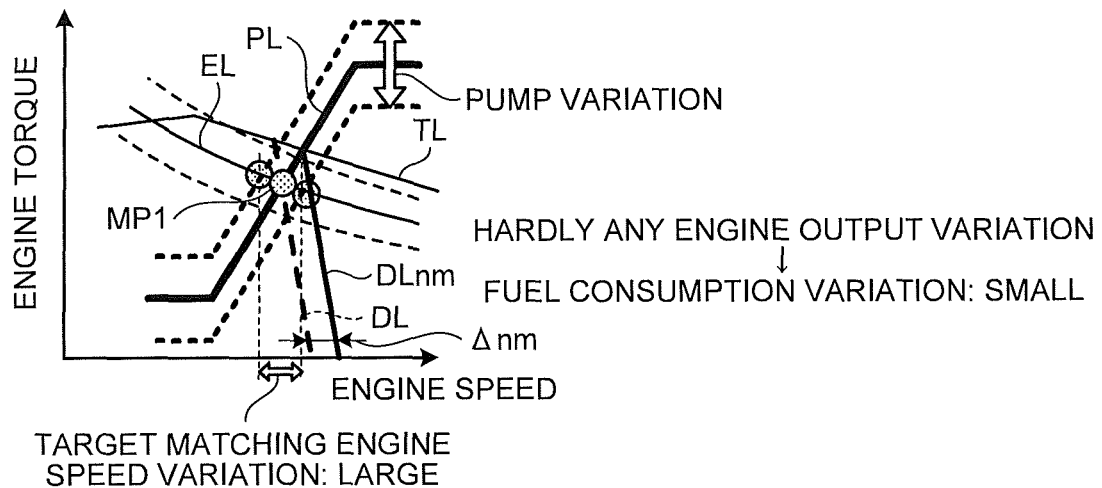
FIG. 17 is a torque line diagram illustrating the state of variation of engine output due to variation of a pump, according to an embodiment of this invention.

More specifically, as illustrated in FIG. 16, in the past, a crossing point of the pump absorption torque line PL and the target matching engine speed is adopted as a target matching point MP1, and therefore, when the successive performance of the hydraulic pump greatly varies, the engine output accordingly greatly varies on the droop line DL. As a result, the fuel-efficiency greatly varies, and there may be a case where it may be difficult to satisfy the specification of the fuel-efficiency of the hybrid excavator 1. In contrast, according to the present embodiment, as illustrated in FIG. 17, the crossing point between the pump absorption torque line PL and the engine output command value curved line EL which is the equal horsepower curved line and indicates the upper limit of the engine output is adopted as the target matching point MP1, and even when the successive performance of the hydraulic pump greatly varies, the target matching point MP1 varies along the engine output command value curved line EL. Therefore, the engine output hardly varies, and as a result, the fuel-efficiency hardly varies.

Figure 18:
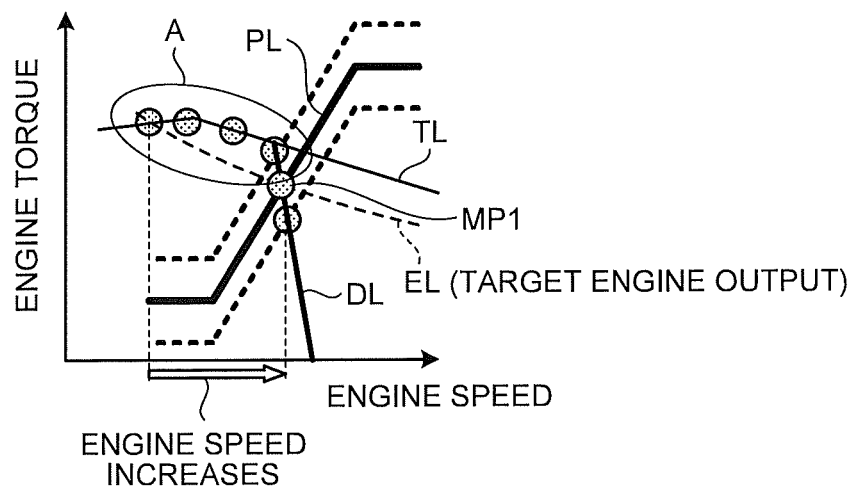
FIG. 18 is a torque line diagram illustrating engine output transition state during change, in conventional engine control.
Figure 19:
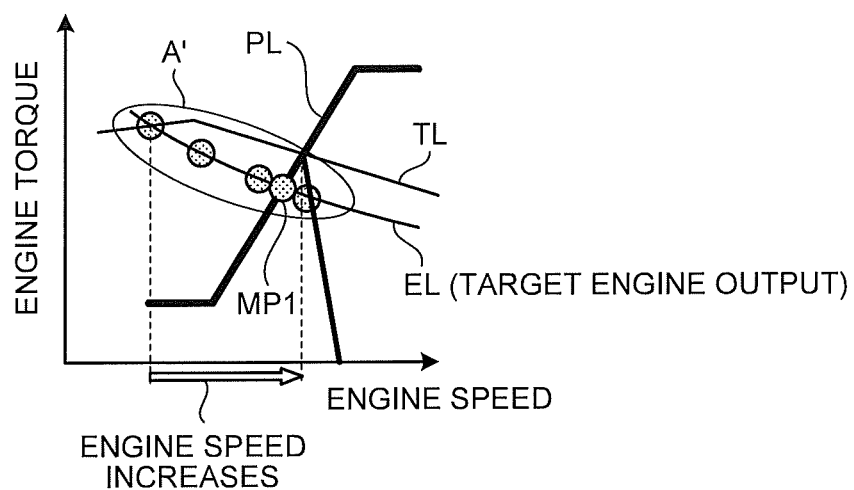
FIG. 19 is a torque line diagram illustrating engine output transition state during change, according to an embodiment of this invention.

In the conventional engine control, as illustrated in FIG. 18, in a transition state in which the engine 17 changes from the state of idling rotation to increase the engine speed so that the engine output changes to the target matching point MP1, the engine output passes the droop line DL passing the maximum output torque line TL and the target matching point MP1, and therefore, the engine output during the transition is excessively larger than the target engine output as illustrated in an enclosed portion A of FIG. 18, and this deteriorates the fuel-efficiency. In contrast, according to the present embodiment, as illustrated in FIG. 19, the crossing point of the pump absorption torque line PL and the engine output command value curved line EL is adopted as the target matching point MP1, and therefore, during the transition, the engine output changes to the target matching point MP1 along the engine output command value curved line EL as illustrated by an enclosed portion A of FIG. 19. For this reason, even in the transition, the same engine output as the target engine output can be obtained, and this improves the fuel-efficiency.

[Engine Assist Control]

In this case, as described above, the capacitor accumulates (stores) electric energy generated by regeneration action when the swing motor 24 is decelerated, and accumulates (stores) electric energy generated by the generator 19. In accordance with the situation of work, the accumulated electric energy is provided (discharged) to the generator 19, so that the engine 17 can be accelerated (assisted).

Figure 20:
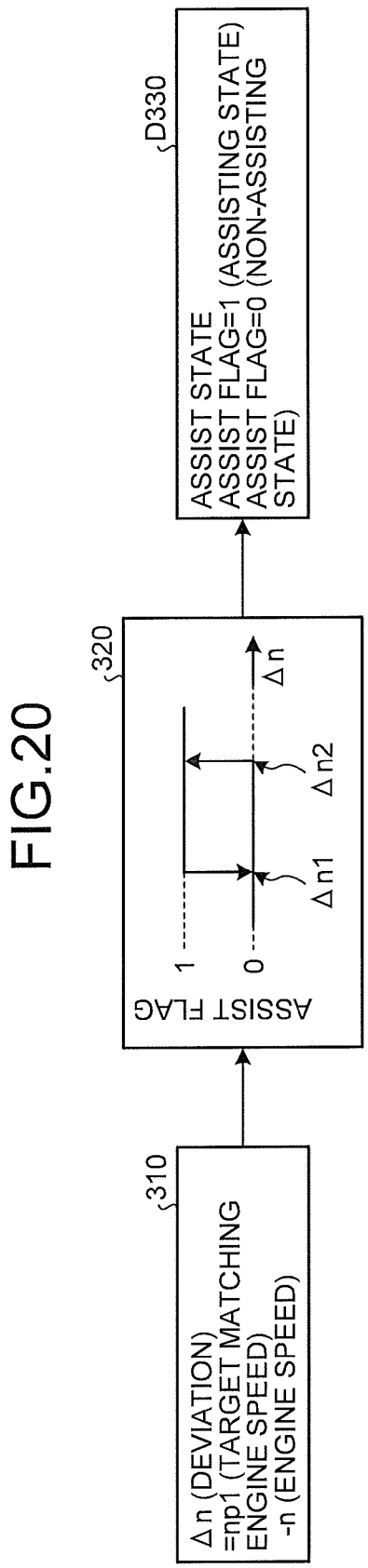
FIG. 20 is a diagram illustrating a flow for determining an assist state.

First, in the engine controller 30, an assist state determination unit as illustrated in FIG. 20 determines whether it is necessary to assist the engine 17 or not. In the assist state determination unit, first, the deviation calculation unit 310 obtains a deviation Δn of an engine speed obtained by deducting a current engine speed n from the target matching engine speed np1. The current engine speed n is detected with an engine speed sensor, not illustrated. Then, the assist determination unit 320 determines and outputs an assist state D330 on the basis of the deviation Δn. When the deviation Δn is equal to or more than a threshold value Δn2, an assist flag is set to "1" which is an assist state indicating assistance is given, and when the deviation Δn is equal to or less than a threshold value Δn1, an assist flag is set to "0" which is an assist state indicating no assistance is given. More specifically, hysteresis characteristic is given to the setting of the assist state. It should be noted that, when the electric energy accumulated in the capacitor 22 is equal to or less than a predetermined value, the assist determination unit 320 forcibly determines non-assist state.

In this case, in this embodiment, when the assist state changes from the assist state indicating no assistance is given before the start of working machine operation to the assist state indicating assistance is given after the start of working machine operation, the assist control is performed to sufficiently ensure the responsiveness of the working machine 3. That is, the responsiveness of the working machine is ensured at activation from the assist state indicating no assistance is given to the assist state indicating assistance is given.

More specifically, explanation will be hereinafter made with reference to FIG. 21. As illustrated in FIG. 21(b), when transition occurs at a time point t1 from the non-assist state to the assist state, the engine controller 30 sets the target assist engine speed AN at a previously determined upper limit target assist engine speed (high rotation target matching engine speed) hAN which is more than the target matching engine speed np1 as illustrated in FIG. 21(a). Thereafter, for a previously determined predetermined period of time T1 from a time point t1, the engine controller 30 continuously sets the high rotation target matching engine speed hAN at the target assist engine speed. The predetermined period of time T1 is measured by a timer. Further, from a time point t2 when the predetermined period of time T1 ends, the target assist engine speed AN is reduced to the target matching engine speed np1 at an engine speed reduction rate ANr determined in advance. The engine speed reduction rate ANr is an amount of rotational speed (rpm) that is reduced per unit time. It should be noted that, a curved line Ln of FIG. 21(a) denotes a time change of the actual engine speed.

Figure 21:
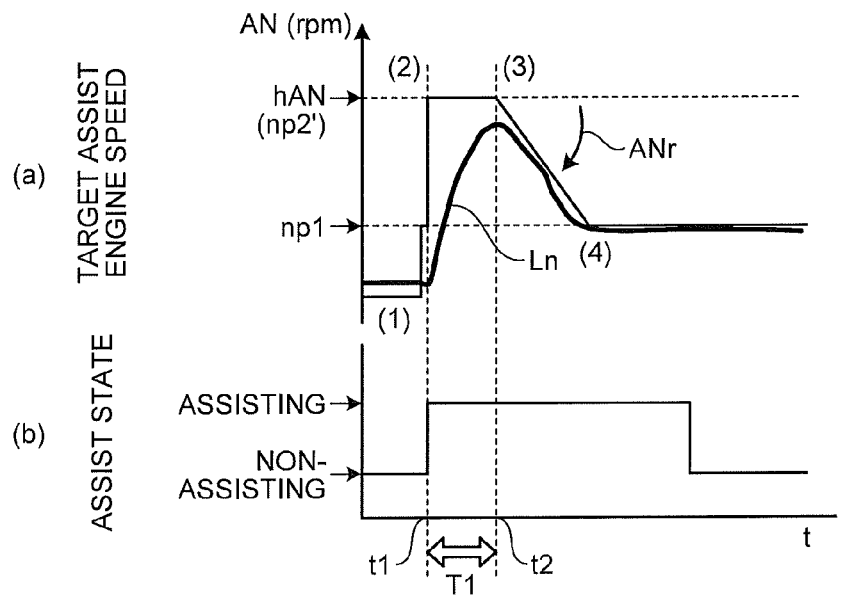
FIG. 21 is a timechart illustrating assist control when working machine operation starts, according to an embodiment of this invention.
Figure 22:
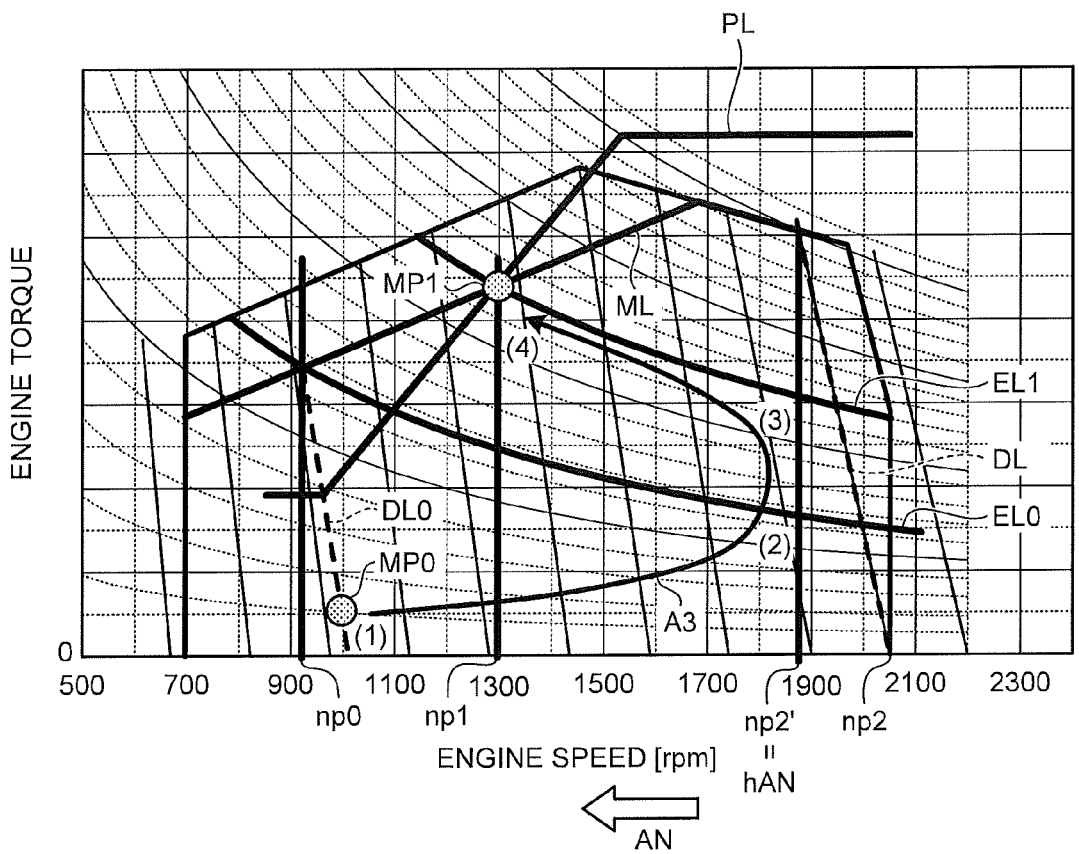
FIG. 22 is a torque line diagram illustrating change of operation point of an engine according to assist control as illustrated in FIG. 21.

When such assist control is performed, the engine speed changes as illustrated in FIG. 22, i.e., immediately after the start of the work operation, the engine speed rapidly increases to the high rotation target matching engine speed hAN (the state (2) of FIGS. 21, 22) from the engine speed of the matching point MP0 before the start of the work operation (the state (1) of FIGS. 21, 22) without being affected by the target matching engine speed np1. Thereafter, for the predetermined period of time T1, the high rotation target matching engine speed hAN is maintained, and the target assist engine speed AN gradually decreases from the level when the predetermined period of time T1 is passed (the state (3) of FIGS. 21, 22) to the target matching engine speed np1, and as the load increases, it is stabilized at the target matching point MP1 (the state (4) of FIGS. 21, 22). More specifically, the engine speed changes as illustrated by an arrow A3, and reaches the target matching point MP1. By performing such assist control, high responsiveness of the working machine 3 can be ensured, and useless energy consumption can be suppressed.

Figure 23:
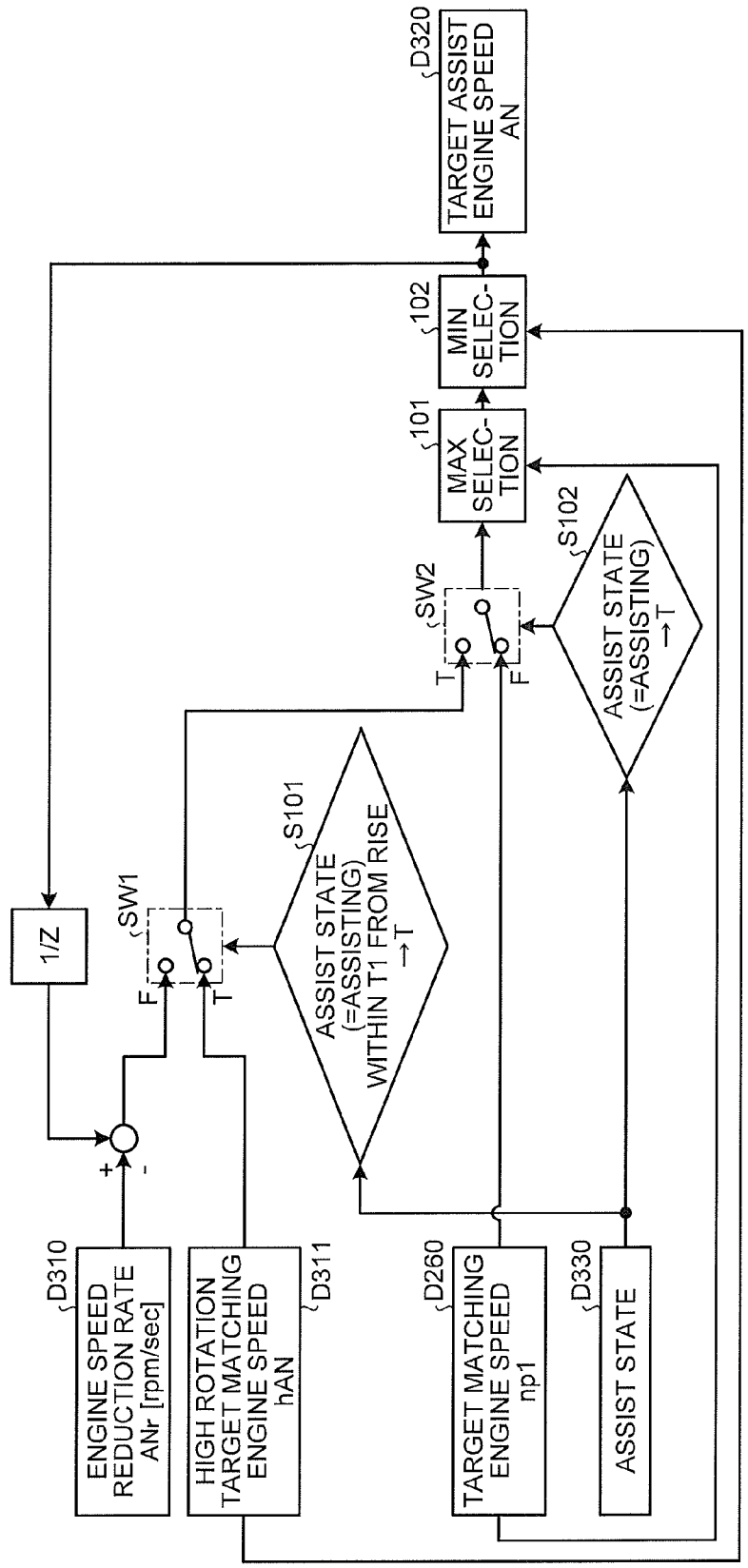
FIG. 23 is a figure illustrating a setting control flow of a target assist engine speed.

Now, the setting control of the target assist engine speed AN explained above will be explained in detail. This setting control is performed by a target assist engine speed setting unit as illustrated in FIG. 23. In FIG. 23, determination units S101, S102 receive the assist state D330 from the assist state determination unit. When the assist state D330 is "assisting" and it is within the predetermined period of time T1 since the time point t1 at which the assist state is attained, the determination unit S101 outputs "T" to a switch SW1, and after the predetermined period of time T1 passes, the determination unit S101 outputs "F" to the switch SW1. On the other hand, when the assist state D330 is "assisting", the determination unit S102 outputs "T" to the switch SW2, and when the assist state D330 is "not assisting", the determination unit S102 outputs "F" to the switch SW2.

A rotational speed obtained by subtracting the engine speed reduction rate ANr (D310) from the target assist engine speed AN (D320) given as feedback for every micro time is input into the "F" terminal of the switch SW1, and a high rotation target matching engine speed hAN (D311) is input into the "T" terminal. Therefore, within the predetermined period of time T1, the switch SW1 outputs the high rotation target matching engine speed hAN (D311) to the "T" terminal of the switch SW2, and after the predetermined period of time T1 passes, the target assist engine speed gradually decreased with the engine speed reduction rate ANr (D310) is input into the "T" terminal.

The output of the switch SW1 is input into the "T" terminal of the switch SW2, and a target matching engine speed np1 (D260) is input into the "F" terminal. Therefore, in the assist state, the switch SW2 outputs any one of the above rotational speeds received from the switch SW1, and in the non-assist state, the switch SW2 outputs the target matching engine speed np1. Then, the maximum value selection unit (MAX selection) 101 outputs the engine speed or the target matching engine speed np1 received from the switch SW2, whichever is larger, to the minimum value selection unit (MIN selection) 102. The minimum value selection unit 102 outputs, as the target assist engine speed AN, the high rotation target matching engine speed hAN or the engine speed received whichever is smaller. More specifically, in the assist state, an engine speed between the high rotation target matching engine speed hAN and the target matching engine speed np1 is output as a largest assist engine speed AN (D230). Then, change of the output of the target assist engine speed AN over time is a waveform of the target assist engine speed as illustrated in FIG. 21(a).

Figure 24:
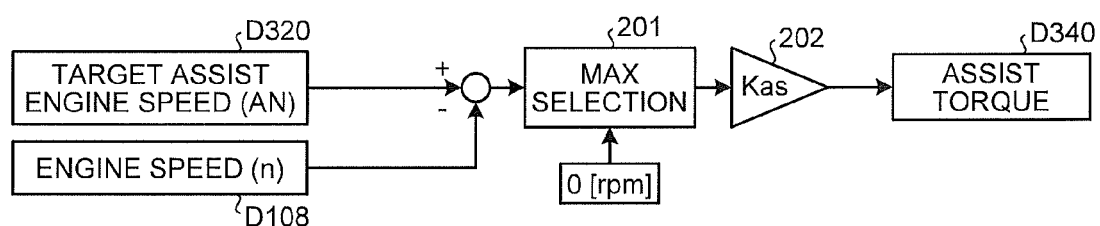
FIG. 24 is a figure illustrating a flow for calculating an assist torque from a target assist engine speed.

The target assist engine speed AN thus set is input into the assist torque calculation unit within the hybrid controller 23a as illustrated in FIG. 24. First, the assist torque calculation unit subtracts the current engine speed n (D108) from the received target assist engine speed AN (D320) (calculation of difference of rotational speed). The maximum value selection unit (MAX selection) 201 outputs this subtracted engine speed or zero value, whichever is larger, to the calculation device 202. The reason why comparison is made with zero value is because when the current engine speed n is more than the target assist engine speed AN, it is not necessary to assist. The calculation device 202 multiplies the received engine speed difference by an assist gain Kas, and outputs the assist torque D340 converted into the torque value. The hybrid controller 23a provides (discharges) the electric energy accumulated in the capacitor 22 to the generator 19 in accordance with the calculated assist torque D340, and assists the output of the engine 17.

In this embodiment, for the predetermined period of time T1 immediately after the assist state is attained, the target assist engine speed AN is set at the high rotation target matching engine speed hAN, and after the predetermined period of time T1 passes, it is gradually decreased to the target matching engine speed np1. Since such assist control is performed, high responsiveness of the working machine 3 can be ensured, and useless energy consumption can be suppressed.

Figure 25:
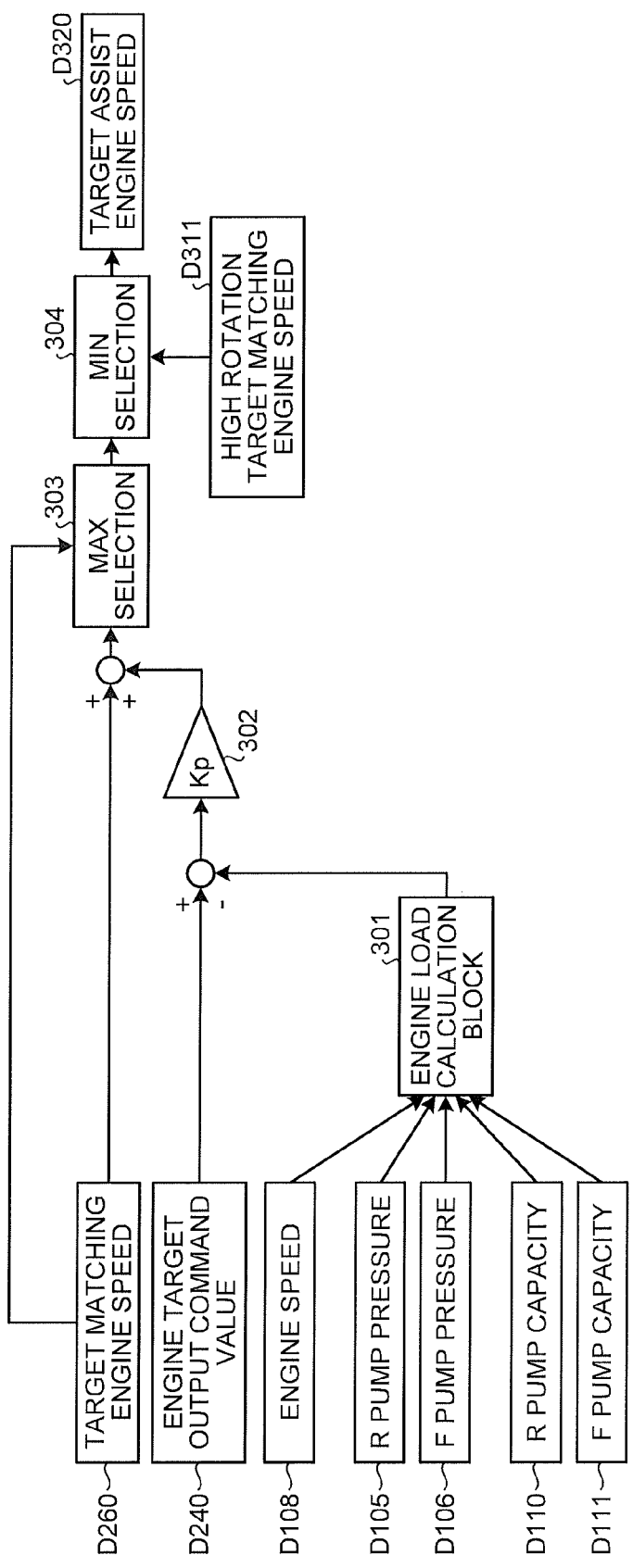
FIG. 25 is a figure illustrating another setting control flow of a target assist engine speed.
Figure 26:
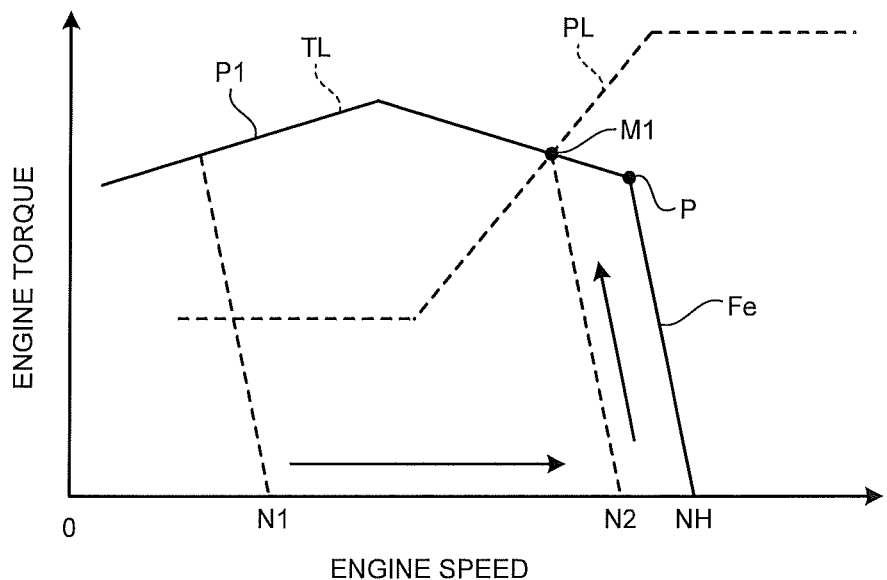
FIG. 26 is a torque line diagram for explaining conventional engine control.

Instead of the target assist engine speed setting unit as illustrated in FIG. 23, the target assist engine speed AN (D320) may be set on the basis of the engine load state as illustrated in FIG. 25. The engine load is actually a pump load of the hydraulic pump 18, and when the pump load is high, the target assist engine speed AN (D320) is set as a low value, and when the pump load is low, the target assist engine speed AN (D320) is set as a high value.

In FIG. 25, first, an engine load calculation block 301 calculates the engine load, on the basis of the engine speed D108, the pump pressures D105, D106, and pump capacities D110, D111. More specifically, first, the pump discharge amount is obtained as follows: pump discharge amount [L/min]=(engine speed[rpm]×average pump capacity[cc/rev])/60, and using this pump discharge amount, the engine load is obtained using the following expression.

Engine load[kW]=(pump discharge amount [L/min]× average pump pressure [MPa])/60

The calculation device 302 outputs a value obtained by converting into the rotational speed by multiplying the output obtained by subtracting the above engine load from the engine target output D240 by the gain Kp. This converted value is added to the received target matching engine speed np1 (D260), and the added engine speed is input into the maximum value selection unit (MAX selection) 303. The maximum value selection unit 303 outputs the target matching engine speed np1 (D260) and the added engine speed, whichever is larger, to the minimum value selection unit (MIN selection) 304. The minimum value selection unit 304 outputs, as the ultimate target assist engine speed AN (D320), the received engine speed and the high rotation target matching engine speed hAN (D311).

As described above, even when the target assist engine speed AN (D320) that is set by obtaining the engine load, high responsiveness of the working machine 3 can be ensured, and useless energy consumption can be suppressed. The engine load calculated by the engine load calculation block 301 of FIG. 25 may also be obtained using only information about the pump capacity of the hydraulic pump 18 (detection value of swash plate angle sensor 18a).

It should be noted that the high rotation target matching engine speed hAN is preferably an engine speed np2' at the crossing point of the target matching route ML and the droop line of the no-load maximum engine speed np2.

The threshold value Δn2 of the deviation Δn explained with reference to FIG. 20 is preferably determined in advance in accordance with the operation state of the hybrid excavator 1 (work machine). In particular, it is preferably determined in accordance with the work pattern and the work mode.

In the present embodiment, the hybrid excavator 1 is explained as an example of the work machine, but the present embodiment can also be applied to a hybrid wheel loader having a driving electric motor instead of driving hydraulic motor of a wheel loader. More specifically, the hybrid wheel loader includes an engine, a generator, and a capacitor (electricity storage device), and is a work machine that moves by providing electric energy from the capacitor or electric energy from the generator to a driving electric motor, and during deceleration, electric energy generated by regeneration action of the driving electric motor is provided to the capacitor (the capacitor is charged thereby). Using the present invention, the output of the engine is assisted by the generator in accordance with the situation of the work with the hybrid wheel loader, and the working machine is operated by driving of the hydraulic pump, so that responsiveness of the working machine can be sufficiently ensured with assist effect while improving the fuel and pump efficiency.

REFERENCE SIGNS LIST 1 excavator
2 vehicle main body
3 working machine
4 lower running body
5 upper swing body
11 boom
12 arm
13 bucket
14 boom cylinder
15 arm cylinder
16 bucket cylinder
17 engine
18 hydraulic pump
18a swash plate angle sensor
19 generator
20 control valve
20a pump-pressure detection unit
21 running motor
22 capacitor
23 inverter
23a hybrid controller
24 swing motor
25 rotation sensor
26 manipulation lever
27 lever manipulation amount detection unit
28 fuel adjustment dial
29 mode switching unit
30 engine controller
32 common rail control unit
33 pump controller

The invention claimed is:

1. An engine control device of a work machine comprising:
an engine;
a generator for assisting an output of the engine;
a detection unit for detecting an operation state of the work machine;
a no-load maximum engine speed calculation unit for calculating, on the basis of the operation state, a no-load maximum engine speed which is an engine speed of the engine which can be attained at most when no load is applied;
a target matching engine speed calculation unit for calculating, on the basis of the operation state, a target matching engine speed which is an engine speed of the engine which can be attained when a load is applied, wherein the target matching engine speed is calculated separately from the no-load maximum engine speed;
an engine target output calculation unit for calculating, on the basis of the operation state, an engine target output which can be output at most;
an engine control unit for controlling an engine speed between the no-load maximum engine speed and the target matching engine speed under limitation of the engine target output;

an assist determination unit for determining that assisting is required when a deviation of the target matching engine speed and a current engine speed is equal to or more than a predetermined value; and an assist engine speed setting unit, when it is determined by the assist determination unit, that assisting is required, sets the target assist engine speed for a predetermined time at a previously determined upper limit target assist engine speed more than the target matching engine speed, and thereafter sets the target assist engine speed gradually closer to the target matching engine speed, wherein the engine control unit outputs an assist torque command value to the generator and controls the engine speed, so that the engine speed attains the target assist engine speed.

2. The engine control device according to claim 1, wherein for a predetermined time from the time point at which it is determined that the assisting is required, the assist engine speed setting unit sets the target assist engine speed at an upper limit target assist engine speed, the assist engine speed setting unit sets the target assist engine speed such that the engine speed is reduced to the target matching engine speed with a predetermined engine speed reduction rate.

3. An engine control device of a work machine comprising:
an engine;
a generator for assisting an output of the engine;
a detection unit for detecting an operation state of the work machine;
a no-load maximum engine speed calculation unit for calculating, on the basis of the operation state, a no-load maximum engine speed which is an engine speed of the engine which can be attained at most when no load is applied;
a target matching engine speed calculation unit for calculating, on the basis of the operation state, a target matching engine speed which is an engine speed of the engine which can be attained when a load is applied, wherein the target matching engine speed is calculated separately from the no-load maximum engine speed;
an engine target output calculation unit for calculating, on the basis of the operation state, an engine target output which can be output at most;
an engine control unit for controlling an engine speed between the no-load maximum engine speed and the target matching engine speed under limitation of the engine target output;
an assist determination unit for determining that assisting is required when a deviation of the target matching engine speed and a current engine speed is equal to or more than a predetermined value;
an assist engine speed setting unit, when it is determined by the assist determination unit, that assisting is required, sets the target assist engine speed for a predetermined time at a previously determined upper limit target assist engine speed more than the target matching engine speed, and thereafter sets the target assist engine speed gradually closer to the target matching engine speed, and
a load calculation unit for calculating an engine load on the basis of a detection result of the detection unit,
wherein the engine control unit outputs an assist torque command value to the generator and controls the engine speed, so that the engine speed attains the target assist engine speed, and
wherein the assist engine speed setting unit makes setting to reduce the target assist engine speed in accordance with increase of the engine load with the upper limit target assist engine speed or less.

4. An engine control device of a work machine comprising:
an engine;
a generator for assisting an output of the engine;
a detection unit for detecting an operation state of the work machine;
a no-load maximum engine speed calculation unit for calculating, on the basis of the operation state, a no-load maximum engine speed which is an engine speed of the engine which can be attained at most when no load is applied;
a target matching engine speed calculation unit for calculating, on the basis of the operation state, a target matching engine speed which is an engine speed of the engine which can be attained when a load is applied, wherein the target matching engine speed is calculated separately from the no-load maximum engine speed;
an engine target output calculation unit for calculating, on the basis of the operation state, an engine target output which can be output at most;
an engine control unit for controlling an engine speed between the no-load maximum engine speed and the target matching engine speed under limitation of the engine target output;
an assist determination unit for determining that assisting is required when a deviation of the target matching engine speed and a current engine speed is equal to or more than a predetermined value; and
an assist engine speed setting unit, when it is determined by the assist determination unit, that assisting is required, sets the target assist engine speed for a predetermined time at a previously determined upper limit target assist engine speed more than the target matching engine speed, and thereafter sets the target assist engine speed gradually closer to the target matching engine speed,
wherein the engine control unit outputs an assist torque command value to the generator and controls the engine speed, so that the engine speed attains the target assist engine speed, and
wherein the upper limit target assist engine speed is an engine speed at a crossing point of a target matching route and a droop line of the no-load maximum engine speed.

5. The engine control device according to claim 1, wherein the predetermined value of the deviation is determined in accordance with an operation state of the work machine.

6. An engine control method of a work machine, comprising:
detecting an operation state of the work machine;
calculating, on the basis of the operation state, a no-load maximum engine speed which is an engine speed of the engine which can be attained at most when no load is applied;
calculating, on the basis of the operation state, a target matching engine speed which is an engine speed of the engine which can be attained when a load is applied, wherein the target matching engine speed is calculated separately from the no-load maximum engine speed;
calculating, on the basis of the operation state, an engine target output which can be output at most;
controlling an engine speed between the no-load maximum engine speed and the target matching engine speed under limitation of the engine target output;

determining that assisting is required when a deviation of the target matching engine speed and a current engine speed is equal to or more than a predetermined value; and setting an assist engine speed, wherein when it is determined, by the determining, that assisting is required, the target assist engine speed is set, for a predetermined time, at a previously determined upper limit target assist engine speed more than the target matching engine speed, and thereafter the target assist engine speed is set gradually closer to the target matching engine speed, wherein in the controlling of the engine speed, an assist torque command value is output to the generator to assist output of the engine and the engine speed is controlled, so that the engine speed attains the target assist engine speed.

7. The engine control method according to claim 6, wherein in the setting the assist engine speed, for a predetermined time from the time point at which it is determined that the assisting is required, the target assist engine speed is set at an upper limit target assist engine speed, the target assist engine speed is set such that the engine speed is reduced to the target matching engine speed with a predetermined engine speed reduction rate.

8. An engine control method of a work machine, comprising:

detecting an operation state of the work machine;

calculating, on the basis of the operation state, a no-load maximum engine speed which is an engine speed of the engine which can be attained at most when no load is applied;

calculating, on the basis of the operation state, a target matching engine speed which is an engine speed of the engine which can be attained when a load is applied, wherein the target matching engine speed is calculated separately from the no-load maximum engine speed;

calculating, on the basis of the operation state, an engine target output which can be output at most:

controlling an engine speed between the no-load maximum engine speed and the target matching engine speed under limitation of the engine target output;

determining that assisting is required when a deviation of the target matching engine speed and a current engine speed is equal to or more than a predetermined value;

setting an assist engine speed, and calculating an engine load on the basis of a detection result of the detecting the operation state, wherein when it is determined, by the determining, that assisting is required, the target assist engine speed is set, for a predetermined time, at a previously determined upper limit target assist engine speed more than the target matching engine speed, and thereafter the target assist engine speed is set gradually closer to the target matching engine speed, wherein in the controlling of the engine speed, an assist torque command value is output to the generator to assist output of the engine and the engine speed is controlled, so that the engine speed attains the target assist engine speed, and wherein in the setting the assist engine speed, setting is made to reduce the target assist engine speed in accordance with increase of the engine load with the upper limit target assist engine speed or less.

9. An engine control method of a work machine, comprising:

detecting an operation state of the work machine;

calculating, on the basis of the operation state, a no-load maximum engine speed which is an engine speed of the engine which can be attained at most when no load is applied;

calculating, on the basis of the operation state, a target matching engine speed which is an engine speed of the engine which can be attained when a load is applied, wherein the target matching engine speed is calculated separately from the no-load maximum engine speed;

calculating, on the basis of the operation state, an engine target output which can be output at most;

controlling an engine speed between the no-load maximum engine speed and the target matching engine speed under limitation of the engine target output;

determining that assisting is required when a deviation of the target matching engine speed and a current engine speed is equal to or more than a predetermined value; and setting, when required, the target assist engine speed for a predetermined time at a previously determined upper limit target assist engine speed more than the target matching engine speed, and thereafter sets the target assist engine speed gradually closer to the target matching engine speed, wherein the engine speed attains the target assist engine speed by outputting an assist torque command value to the generator and controlling the engine speed, and wherein the upper limit target assist engine speed is an engine speed at a crossing point of a target matching route and a droop line of the no-load maximum engine speed.

* * * * *